(12) United States Patent
Rusanovskyy et al.

(10) Patent No.: US 11,463,737 B2
(45) Date of Patent: Oct. 4, 2022

(54) SIGNALING OF DYNAMIC RANGE ADJUSTMENT PARAMETERS FOR DECODED PICTURE BUFFER MANAGEMENT AND DYNAMIC RANGE

(71) Applicant: QUALCOMM Incorporated, San Diego, CA (US)

(72) Inventors: Dmytro Rusanovskyy, San Diego, CA (US); Adarsh Krishnan Ramasubramonian, Irvine, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/179,145

(22) Filed: Feb. 18, 2021

(65) Prior Publication Data

US 2021/0266605 A1  Aug. 26, 2021

Related U.S. Application Data

(60) Provisional application No. 62/980,062, filed on Feb. 21, 2020.

(51) Int. Cl.
*H04N 19/85* (2014.01)
*H04N 19/172* (2014.01)
*H04N 19/70* (2014.01)
*H04N 19/186* (2014.01)
*H04N 19/43* (2014.01)

(52) U.S. Cl.
CPC ........... *H04N 19/85* (2014.11); *H04N 19/172* (2014.11); *H04N 19/70* (2014.11)

(58) Field of Classification Search
None
See application file for complete search history.

(56) References Cited

U.S. PATENT DOCUMENTS

2016/0309154 A1* 10/2016 Rusanovskyy ...... H04N 19/176
2021/0392323 A1* 12/2021 Wang ................... H04N 19/186

OTHER PUBLICATIONS

Bross B. et al., "Versatile Video Coding (Draft 8)", JVET-Q2001-vC, Joint Video Experts Team (JVET) of ITU-T SG 16 WP 3 and ISO/IEC JTC 1/SC 29/WG 11, 17th Meeting: Brussels, BE, Jan. 7-17, 2020, 512 pages.
International Search Report and Written Opinion—PCT/US2021/018811—ISA/EPO—dated Apr. 1, 2021, 14 pp.

(Continued)

*Primary Examiner* — Christopher Braniff
(74) *Attorney, Agent, or Firm* — Shumaker & Sieffert, P.A.

(57) ABSTRACT

An example device includes a memory configured to store video data and one or more processors implemented in circuitry and communicatively coupled to the memory. The one or more processors are configured to determine a first dynamic range adjustment (DRA) adaptation parameter set (APS) for a first picture of the video data and assign a first DRA APS ID to the first DRA APS. The one or more processors are configured to determine a second DRA APS for a second picture of the video data and assign a second DRA APS ID to the second DRA APS. The one or more processors are configured to process the second picture in accordance with the first DRA APS if the first DRA APS ID and the second DRA APS ID are equal.

29 Claims, 18 Drawing Sheets

(56) References Cited

OTHER PUBLICATIONS

ITU-R Recommendation BT.2020-2, "Parameter Values for Ultra-High Definition Television Systems for Production and International Programme Exchange", ITU-R BT.2020-2, Oct. 2015, 8 Pages.

ITU-R Recommendation BT.709-6, "Parameter Values for the HDTV Standards for Production and International Programme Exchange", ITU-R BT.709-6, Jun. 2015, 19 Pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

QUALCOMM Inc: "Dynamic Range Adjustment SEI to Enable High Dynamic Range Video Coding with Backward-Compatible Capability", ITU-T SG16 Meeting, Oct. 12, 2015-Oct. 23, 2015, Geneva, No. COM 16-C 1027-E, ITU-T, Sep. 29, 2015, XP030100746, pp. 1-11.

Ramasubramonian A.K., "HDR CE2.a-1: Report on LCS", Joint Collaborative Team on Video Coding (JCT-VC) of ITU-T SG 16 WP 3 and ISO/IEC JTC 1/SC 29/WG 11, 23rd Meeting, San Diego, USA, Feb. 19-26, 2016, No. JCTVC-W0101r1, 2 pages.

Rusanovskyy (QUALCOMM) D., et al., "[EVC] On HDR/WCG Support in EVC", 129. MPEG Meeting, Jan. 13, 2020-Jan. 17, 2020, Brussels, (Motion Picture Expert Group or ISO/IEC JTC1/SC29/WG11), No. m52291, m52290, Jan. 12, 2020 (Jan. 12, 2020), XP030224896, Retrieved from the Internet: URL:http://phenix.int-evry.fr/mpeg/doc_end_user/documents/129_Brussels/wg11/m52291-v3-m52291_hdr_r2.zip m52291_hdr_r2.docx [retrieved on Jan. 12, 2020] 6 pp.

Rusanovskyy (QUALCOMM) D., et al., "[EVC] Suggested Improvements for EVC Specification and Test Model", 129. MPEG Meeting, Jan. 13, 2020-Jan. 17, 2020, Brussels, (Motion Picture Expert Group or ISO/IEC JTC1/SC29/WG11), No. m52290, Jan. 16, 2020 (Jan. 16, 2020), XP030224893, Retrieved from the Internet: URL:http://phenix.int-evry.fr/mpeg/doc_end_user/documents/129_Brussels/wg11/m52290-v4-m52291_hdr_r5.zipm52291_draftText_EVC_Study_Text_FDIS_23094-1 r2.docx [retrieved on Jan. 16, 2020], 4 pp.

SMPTE Standard for Motion-Picture Film (8-mm TypeR)—Camera Aperture Image and Usage, SMPTE 231-2004, Society of Motion Picture & Television Engineers, Nov. 8, 2004, 4 pages.

SMPTE Standard, "High Dynamic Range Electro-Optical Transfer Function of Mastering Reference Displays", SMPTE ST 2084:2014, The Society of Motion Picture and Television Engineers, Aug. 16, 2014, XP055225088, pp. 1-14.

* cited by examiner

Example of EOTFs

TABLE 8-10 – SPECIFICATION OF Qpc AS A FUNCTION OF qPi FOR CHROMAARRAYTYPE EQUAL TO 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qpc | =qPi | 29 | 30 | 31 | 32 | 33 | 33 | 34 | 34 | 35 | 35 | 36 | 36 | 37 | 37 | =qPi−6 |

FIG. 12

SIGNALING OF DYNAMIC RANGE ADJUSTMENT PARAMETERS FOR DECODED PICTURE BUFFER MANAGEMENT AND DYNAMIC RANGE

This application claims priority to U.S. Provisional Application No. 62/980,062, filed Feb. 21, 2020, the entire contents of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding of video signals with High Dynamic Range (HDR) and Wide Color Gamut (WCG) representations. More specifically, the current disclosure describes signaling and operations applied to video data in certain color spaces to enable more accurate reproduction of HDR and WCG video data. The techniques of this disclosure define encoding and decoding operations that may improve the decoding accuracy of hybrid-based video coding systems utilized for coding HDR & WCG video data by preventing the overwriting of data in a dynamic range adjustment (DRA) adaptation parameter set (APS) with different data.

In one example, a method includes determining a first dynamic range adjustment (DRA) adaptation parameter set (APS) for a first picture of the video data; assigning a first DRA APS ID to the first DRA APS; determining a second DRA APS for a second picture of the video data; assigning a second DRA APS ID to the second DRA APS; signaling, in a bitstream, the first DRA APS; processing the first picture in accordance with the first DRA APS; determining whether the first DRA APS ID is equal to the second DRA APS ID; if the first DRA APS ID is equal to the second DRA APS ID, processing the second picture in accordance with the first DRA APS; and if the first DRA APS ID is not equal to the second DRA APS ID, signaling, in the bitstream, the second DRA APS and processing the second picture in accordance with the second DRA APS.

In another example, a device includes a memory configured to store the video data and one or more processors implemented in circuitry and communicatively coupled to the memory, the one or more processors being configured to: determine a first dynamic range adjustment (DRA) adaptation parameter set (APS) for a first picture of the video data; assign a first DRA APS ID to the first DRA APS; determine a second DRA APS for a second picture of the video data; assign a second DRA APS ID to the second DRA APS; signal, in a bitstream, the first DRA APS; process the first picture in accordance with the first DRA APS; determine whether the first DRA APS ID is equal to the second DRA APS ID; if the first DRA APS ID is equal to the second DRA APS ID, process the second picture in accordance with the first DRA APS; and if the first DRA APS ID is not equal to the second DRA APS ID, signal, in the bitstream, the second DRA APS and process the second picture in accordance with the second DRA APS.

In another example, a computer-readable storage medium is encoded with instructions that, when executed, cause one or more processors to determine a first dynamic range adjustment (DRA) adaptation parameter set (APS) for a first picture of video data, assign a first DRA APS ID to the first DRA APS, determine a second DRA APS for a second picture of the video data, assign a second DRA APS ID to the second DRA APS, signal, in a bitstream, the first DRA APS, process the first picture in accordance with the first DRA APS, determine whether the first DRA APS ID is equal to the second DRA APS ID, if the first DRA APS ID is equal to the second DRA APS ID, process the second picture in accordance with the first DRA APS, and if the first DRA APS ID is not equal to the second DRA APS ID, signal, in the bitstream, the second DRA APS and process the second picture in accordance with the second DRA APS.

In another example, a device includes means for determining a first dynamic range adjustment (DRA) adaptation parameter set (APS) for a first picture of the video data, means for assigning a first DRA APS ID to the first DRA APS, means for determining a second DRA APS for a second picture of the video data, means for assigning a second DRA APS ID to the second DRA APS, means for signaling, in a bitstream, the first DRA APS, means for processing the first picture in accordance with the first DRA APS, means for determining whether the first DRA APS ID is equal to the second DRA APS ID, if the first DRA APS ID is equal to the second DRA APS ID, means for processing the second picture in accordance with the first DRA APS; and if the first DRA APS ID is not equal to the second DRA APS ID, means for signaling, in the bitstream, the second DRA APS and processing the second picture in accordance with the second DRA APS.

In another example, a method includes determining a first dynamic range adjustment (DRA) adaptation parameter set (APS) identifier (ID) for a first picture of the video data, determining a DRA APS for the first picture, storing the DRA APS in an APS buffer, determining a second DRA APS ID for a second picture of the video data, based on the second DRA APS ID being equal to the first DRA APS ID, preventing overwriting of the stored DRA APS with different data, and processing the first picture and the second picture in accordance with the DRA APS.

In another example, a device includes a memory configured to store the video data and one or more processors implemented in circuitry and communicatively coupled to the memory, the one or more processors being configured to: determine a first dynamic range adjustment (DRA) adaptation parameter set (APS) identifier (ID) for a first picture of the video data; determine a DRA APS for the first picture; store the DRA APS in an APS buffer; determine a second DRA APS ID for a second picture of the video data; based on the second DRA APS ID being equal to the first DRA APS ID, prevent overwriting of the stored DRA APS with different data; and process the first picture and the second picture in accordance with the DRA APS.

In another example, a non-transitory computer-readable storage medium stores instructions that, when executed, cause one or more processors to determine a first dynamic range adjustment (DRA) adaptation parameter set (APS) identifier (ID) for a first picture of video data, determine a DRA APS for the first picture, store the DRA APS in an APS buffer, determine a second DRA APS ID for a second picture of the video data, based on the second DRA APS ID being equal to the first DRA APS ID, prevent overwriting of the stored DRA APS with different data, and process the first picture and the second picture in accordance with the DRA APS.

In another example, a device includes means for determining a first dynamic range adjustment (DRA) adaptation parameter set (APS) identifier (ID) for a first picture of the video data, means for determining a DRA APS for the first picture, means for storing the DRA APS in an APS buffer, means for determining a second DRA APS ID for a second picture of the video data, means for preventing overwriting of the stored DRA APS with different data based on the second DRA APS ID being equal to the first DRA APS ID, and means for processing the first picture and the second picture in accordance with the DRA APS.

The details of one or more examples are set forth in the accompanying drawings and the description below. Other features, objects, and advantages will be apparent from the description, drawings, and claims.

BRIEF DESCRIPTION OF DRAWINGS

FIG. 12 is a conceptual diagram illustrating Table 8-10 of the HEVC specification.

DETAILED DESCRIPTION

A video encoder may signal dynamic range adjustment (DRA) data as a separate network adaptation layer (NAL) unit, with a particular applicable adaptation parameter set (APS) identifier (ID) in a picture parameter set (PPS) for all pictures referring to that PPS. A video decoder may apply an inverse DRA process during an output process which may be temporally decoupled from the decoding process, for example, in Random Access (RA) coding scenario. This potential decoupling of the decoding process and the output process may result in situations where the DRA APS in an APS buffer that may specified by the ID may have been overwritten by a new DRA APS during the decoding process.

To ensure that the DRA APS data in the APS buffer is not overwritten during the decoding process until the DRA is applied (from a corresponding APS ID) during the output process, the techniques of this disclosure prevent the overwriting the APS buffer entry with different data during the decoding process. These techniques constrain the bitstream such that every DRA APS of a particular ID number consist of identical content. In this manner, DRA may be applied appropriately which may improve the quality of video output to a display.

Figure 1:
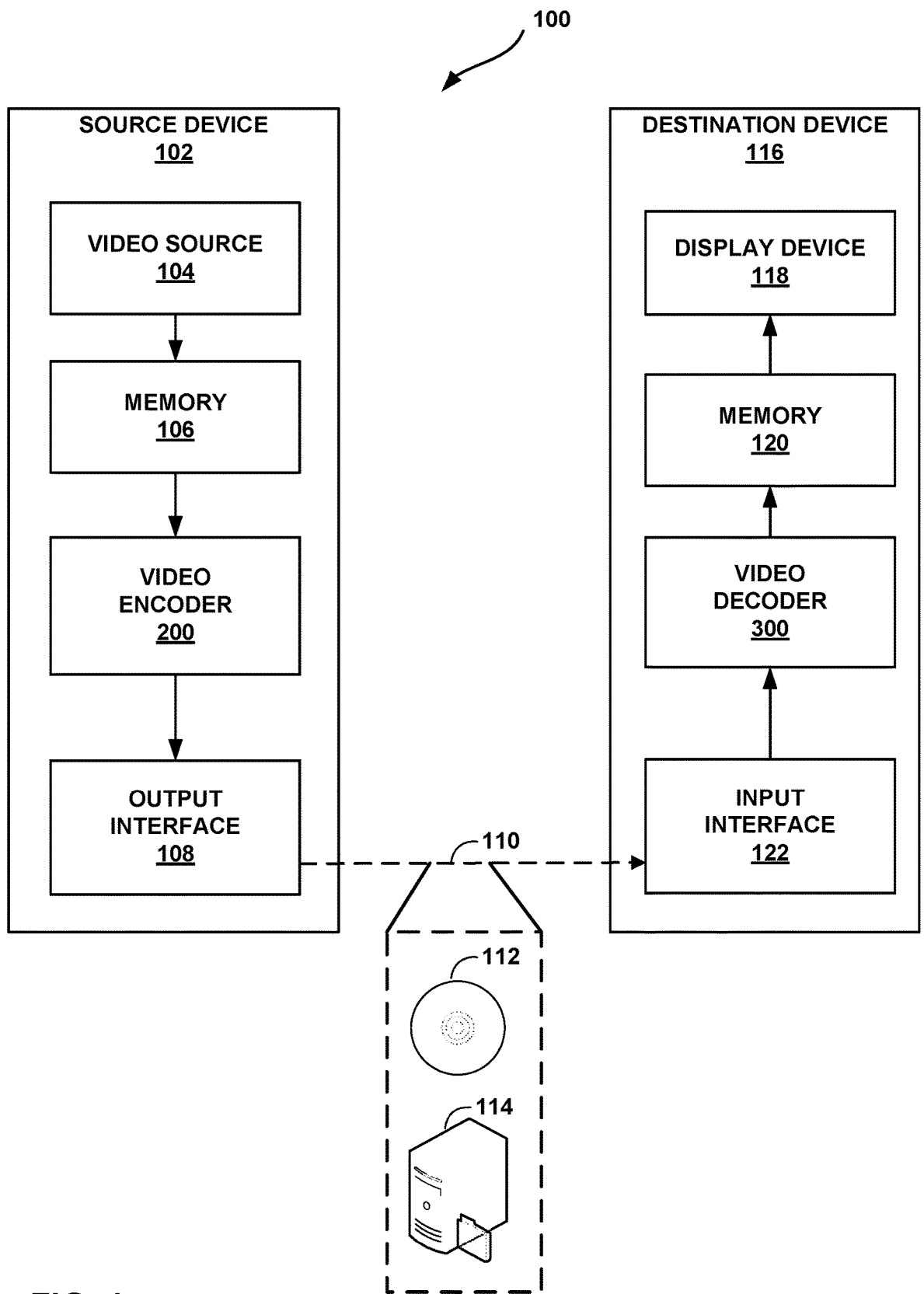
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, video encoding and decoding system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets (mobile devices) such as smartphones, televisions, cameras, display devices, digital media players, video gaming consoles, video streaming device, broadcast receivers or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for signaling and operations applied to video data in certain color spaces. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

Video encoding and decoding system 100 as shown in FIG. 1 is merely one example. In general, any digital video encoding and/or decoding device may perform techniques for signaling and operations applied to video data in certain color spaces. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, video encoding and decoding system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memory 106 and memory 120 may store raw video data, e.g., raw video from video source 104 and raw, decoded video data from video decoder 300. Additionally, or alternatively, memory 106 and memory 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (WET) of ITU-T SG 16 WP 3 and ISO/IEC JTC 1/SC 29/WG 11, $17^{th}$ Meeting: Brussels, BE, 7-17 Jan. 2020, JVET-Q2001-vC (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method includes determining a first dynamic range adjustment (DRA) adaptation parameter set (APS) for a first picture of the video data; assigning a first DRA APS ID to the first DRA APS; determining a second DRA APS for a second picture of the video data; assigning a second DRA APS ID to the second DRA APS; signaling, in a bitstream, the first DRA APS; processing the first picture in accordance with the first DRA APS; determining whether the first DRA APS ID is equal to the second DRA APS ID; if the first DRA APS ID is equal to the second DRA APS ID, processing the second picture in accordance with the first DRA APS; and if the first DRA APS ID is not equal to the second DRA APS ID, signaling, in the bitstream, the second DRA APS and processing the second picture in accordance with the second DRA APS.

In accordance with the techniques of this disclosure, a device includes a memory configured to store the video data and one or more processors implemented in circuitry and communicatively coupled to the memory, the one or more processors being configured to: determine a first dynamic range adjustment (DRA) adaptation parameter set (APS) for a first picture of the video data; assign a first DRA APS ID to the first DRA APS; determine a second DRA APS for a second picture of the video data; assign a second DRA APS ID to the second DRA APS; signal, in a bitstream, the first DRA APS; process the first picture in accordance with the first DRA APS; determine whether the first DRA APS ID is equal to the second DRA APS ID; if the first DRA APS ID is equal to the second DRA APS ID, process the second picture in accordance with the first DRA APS; and if the first DRA APS ID is not equal to the second DRA APS ID, signal, in the bitstream, the second DRA APS and process the second picture in accordance with the second DRA APS.

In accordance with the techniques of this disclosure, a device includes means for determining a first dynamic range adjustment (DRA) adaptation parameter set (APS) for a first picture of the video data, means for assigning a first DRA APS ID to the first DRA APS, means for determining a second DRA APS for a second picture of the video data, means for assigning a second DRA APS ID to the second DRA APS, means for signaling, in a bitstream, the first DRA APS, means for processing the first picture in accordance with the first DRA APS, means for determining whether the first DRA APS ID is equal to the second DRA APS ID, if the first DRA APS ID is equal to the second DRA APS ID, means for processing the second picture in accordance with the first DRA APS; and if the first DRA APS ID is not equal to the second DRA APS ID, means for signaling, in the bitstream, the second DRA APS and processing the second picture in accordance with the second DRA APS.

In accordance with the techniques of this disclosure, a computer-readable storage medium is encoded with instructions that, when executed, cause one or more processors to determine a first dynamic range adjustment (DRA) adaptation parameter set (APS) for a first picture of video data, assign a first DRA APS ID to the first DRA APS, determine a second DRA APS for a second picture of the video data, assign a second DRA APS ID to the second DRA APS, signal, in a bitstream, the first DRA APS, process the first picture in accordance with the first DRA APS, determine whether the first DRA APS ID is equal to the second DRA APS ID, if the first DRA APS ID is equal to the second DRA APS ID, process the second picture in accordance with the first DRA APS, and if the first DRA APS ID is not equal to the second DRA APS ID, signal, in the bitstream, the second DRA APS and process the second picture in accordance with the second DRA APS.

In accordance with the techniques of this disclosure, a method includes determining a first dynamic range adjustment (DRA) adaptation parameter set (APS) identifier (ID) for a first picture of the video data, determining a DRA APS for the first picture, storing the DRA APS in an APS buffer, determining a second DRA APS ID for a second picture of the video data, based on the second DRA APS ID being equal to the first DRA APS ID, preventing overwriting of the stored DRA APS with different data, and processing the first picture and the second picture in accordance with the DRA APS.

In accordance with the techniques of this disclosure, a device includes memory configured to store the video data and one or more processors implemented in circuitry and communicatively coupled to the memory, the one or more processors being configured to: determine a first dynamic range adjustment (DRA) adaptation parameter set (APS) identifier (ID) for a first picture of the video data; determine a DRA APS for the first picture; store the DRA APS in an APS buffer; determine a second DRA APS ID for a second picture of the video data; based on the second DRA APS ID being equal to the first DRA APS ID, prevent overwriting of the stored DRA APS with different data; and process the first picture and the second picture in accordance with the DRA APS.

In accordance with the techniques of this disclosure, a non-transitory computer-readable storage medium stores instructions that, when executed, cause one or more processors to determine a first dynamic range adjustment (DRA) adaptation parameter set (APS) identifier (ID) for a first picture of the video data, determine a DRA APS for the first picture, store the DRA APS in an APS buffer, determine a second DRA APS ID for a second picture of the video data, based on the second DRA APS ID being equal to the first DRA APS ID, prevent overwriting of the stored DRA APS with different data, and process the first picture and the second picture in accordance with the DRA APS.

In accordance with the techniques of this disclosure, a device includes means for determining a first dynamic range adjustment (DRA) adaptation parameter set (APS) identifier (ID) for a first picture of video data, means for determining a DRA APS for the first picture, means for storing the DRA APS in an APS buffer, means for determining a second DRA APS ID for a second picture of the video data, means for preventing overwriting of the stored DRA APS with different data based on the second DRA APS ID being equal to the first DRA APS ID, and means for processing the first picture and the second picture in accordance with the DRA APS.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
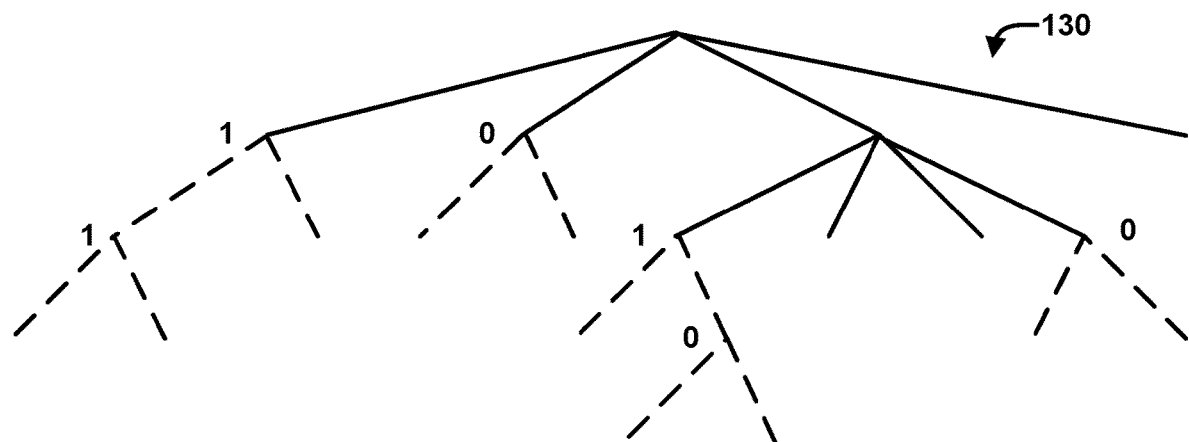
FIGS. 2A and 2B are conceptual diagrams illustrating an example quadtree binary tree (QTBT) structure, and a corresponding coding tree unit (CTU).
Figure 2B:
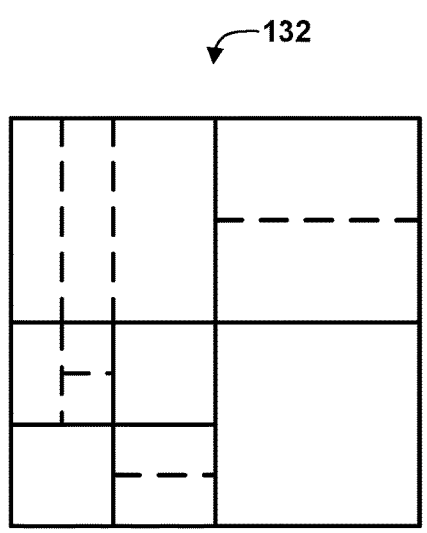

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 3:
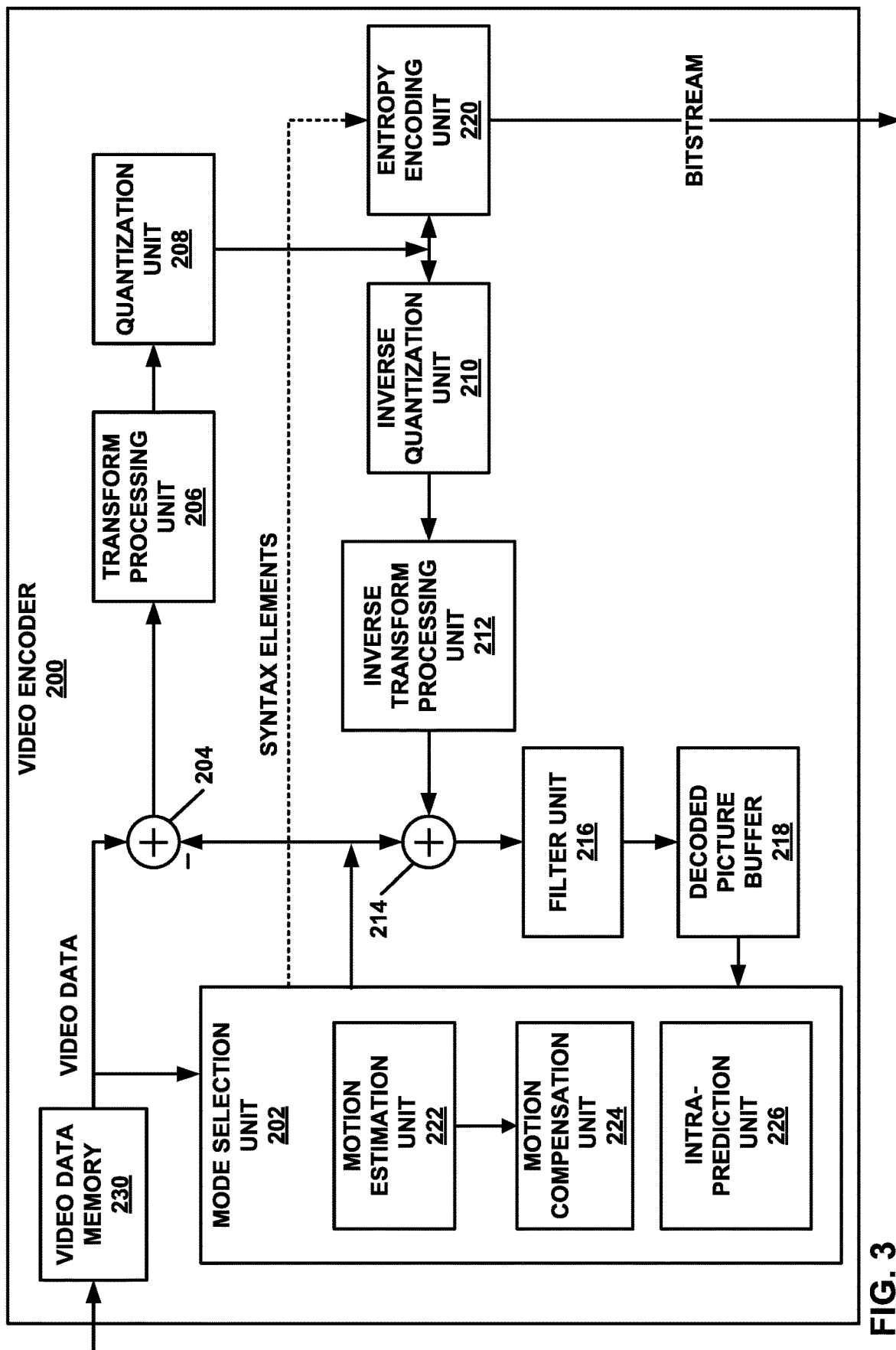
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and communicatively coupled to the memory, the one or more processors being configured to: determine a first dynamic range adjustment (DRA) adaptation parameter set (APS) for a first picture of the video data; assign a first DRA APS ID to the first DRA APS; determine a second DRA APS for a second picture of the video data; assign a second DRA APS ID to the second DRA APS; signal, in a bitstream, the first DRA APS; process the first picture in accordance with the first DRA APS; determine whether the first DRA APS ID is equal to the second DRA APS ID; if the first DRA APS ID is equal to the second DRA APS ID, process the second picture in accordance with the first DRA APS; and if the first DRA APS ID is not equal to the second DRA APS ID, signal, in the bitstream, the second DRA APS and process the second picture in accordance with the second DRA APS.

Figure 4:
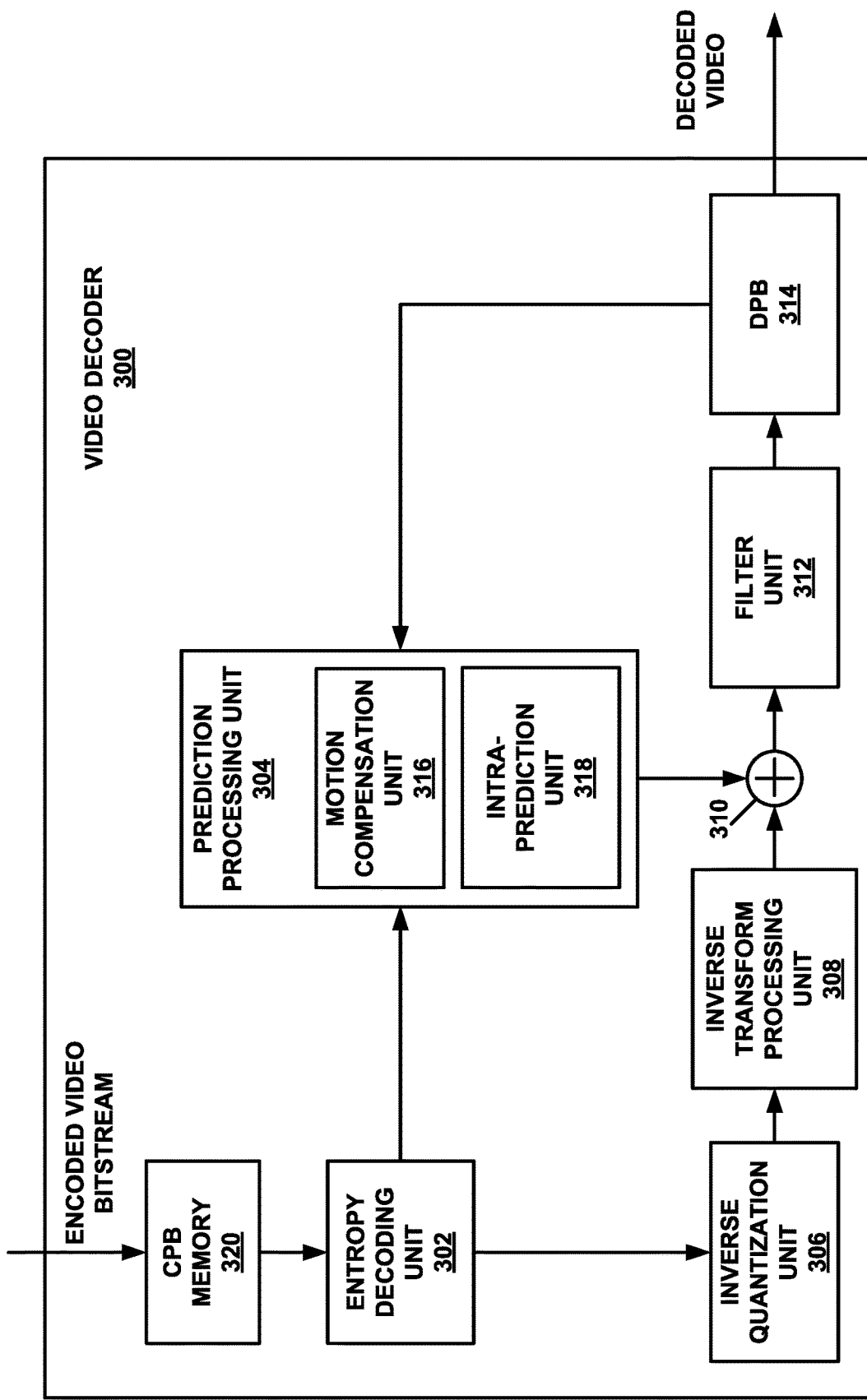
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Video decoder 300 represents a device configured to decode video data that includes a memory configured to store the video data and one or more processors implemented in circuitry and communicatively coupled to the memory, the one or more processors being configured to: determine a first dynamic range adjustment (DRA) adaptation parameter set (APS) identifier (ID) for a first picture of the video data; determine a DRA APS for the first picture; store the DRA APS in an APS buffer; determine a second DRA APS ID for a second picture of the video data; based on the second DRA APS ID being equal to the first DRA APS ID, prevent overwriting of the stored DRA APS with different data; and process the first picture and the second picture in accordance with the DRA APS.

Next generation video applications may operate with video data representing captured scenery with high dynamic range (HDR) and wide color gamut (WCG). Parameters of the utilized dynamic range and color gamut are two independent attributes of video content, and their specification for purposes of digital television and multimedia services are defined by several international standards. For example, specifies ultra-high definition television (UHDTV) parameters such as HDR and WCG. There are also other standards development organization (SDO) documents specifying these attributes in other systems, e.g., P3 color gamut is defined in SMPTE-231-2 and some parameters of HDR are defined SMPTE-2084. A brief description of dynamic range and color gamut for video data follows.

Dynamic range is typically defined as the ratio between the minimum and maximum brightness of a video signal. Dynamic range may also be measured in terms of 'f-stop', where one f-stop corresponds to a doubling of a signal's dynamic range. In MPEG's definition, HDR content is such content that features brightness variation with more than 16 f-stops. In some definitions, levels between 10 and 16 f-stops are considered as intermediate dynamic range, but are considered HDR in other definitions. At the same time, the human visual system (HVS) is capable of perceiving a much larger dynamic range, however the HVS includes an adaptation mechanism to narrow a so-called simultaneous range.

Video application and services may be regulated by Rec.709 and provide SDR, typically supporting a range of brightness (or luminance) of around 0.1 to 100 candelas (cd) per m2 (often referred to as "nits"), leading to less than 10 f-stops. Next generation video services are expected to provide a dynamic range of up-to 16 f-stops and, some parameters have been specified in SMPTE-2084 and Rec.2020.

Figure 5:
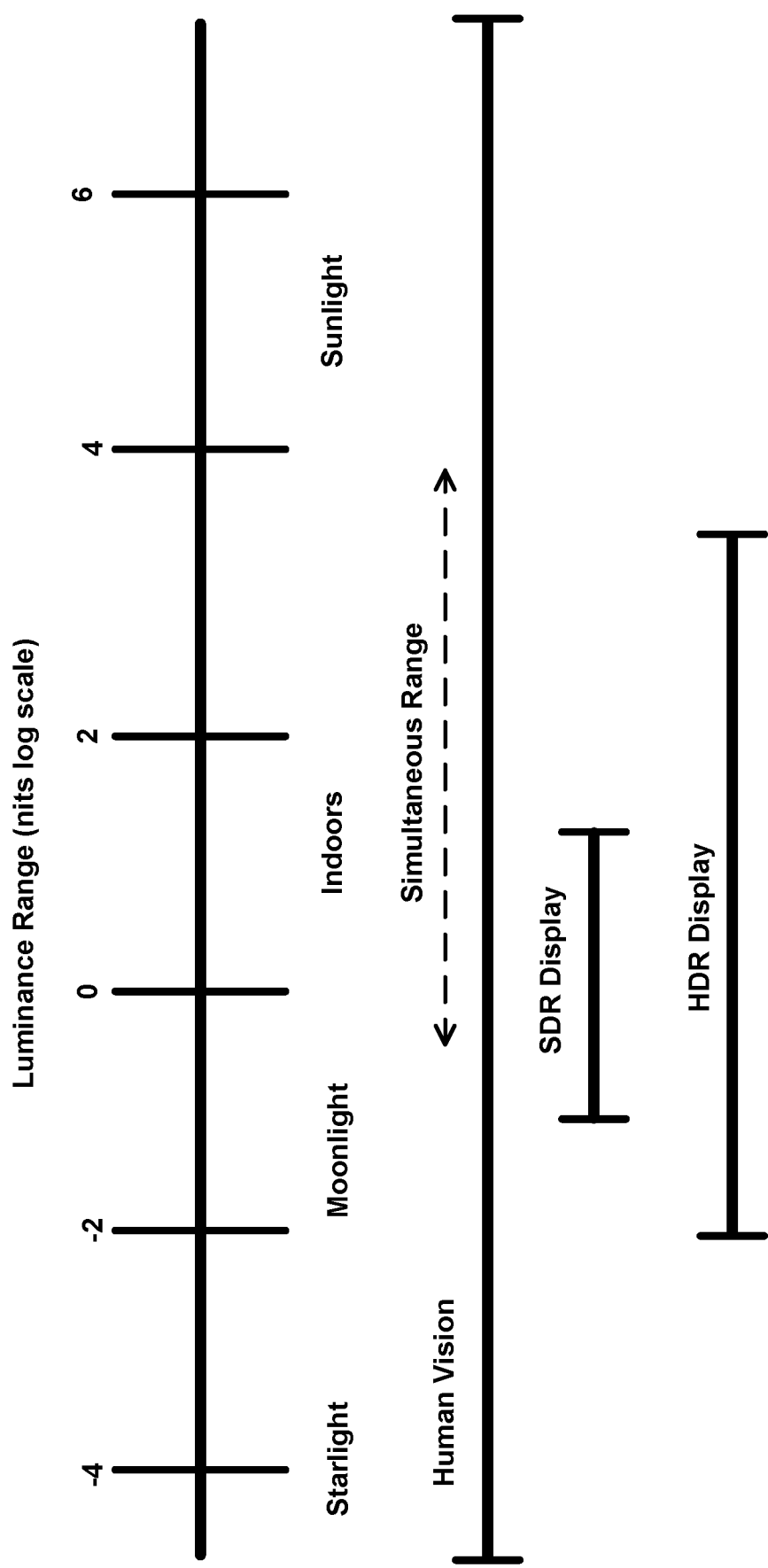
FIG. 5 is a conceptual diagram illustrating human vision and display capabilities.

FIG. 5 is a conceptual diagram illustrating human vision and display capabilities. FIG. 5 depicts a visualization of the dynamic range provided by SDR of HDTV, expected HDR of UHDTV, and the dynamic range of the HVS, although the exact range may vary based on each individual and display.

Figure 6:
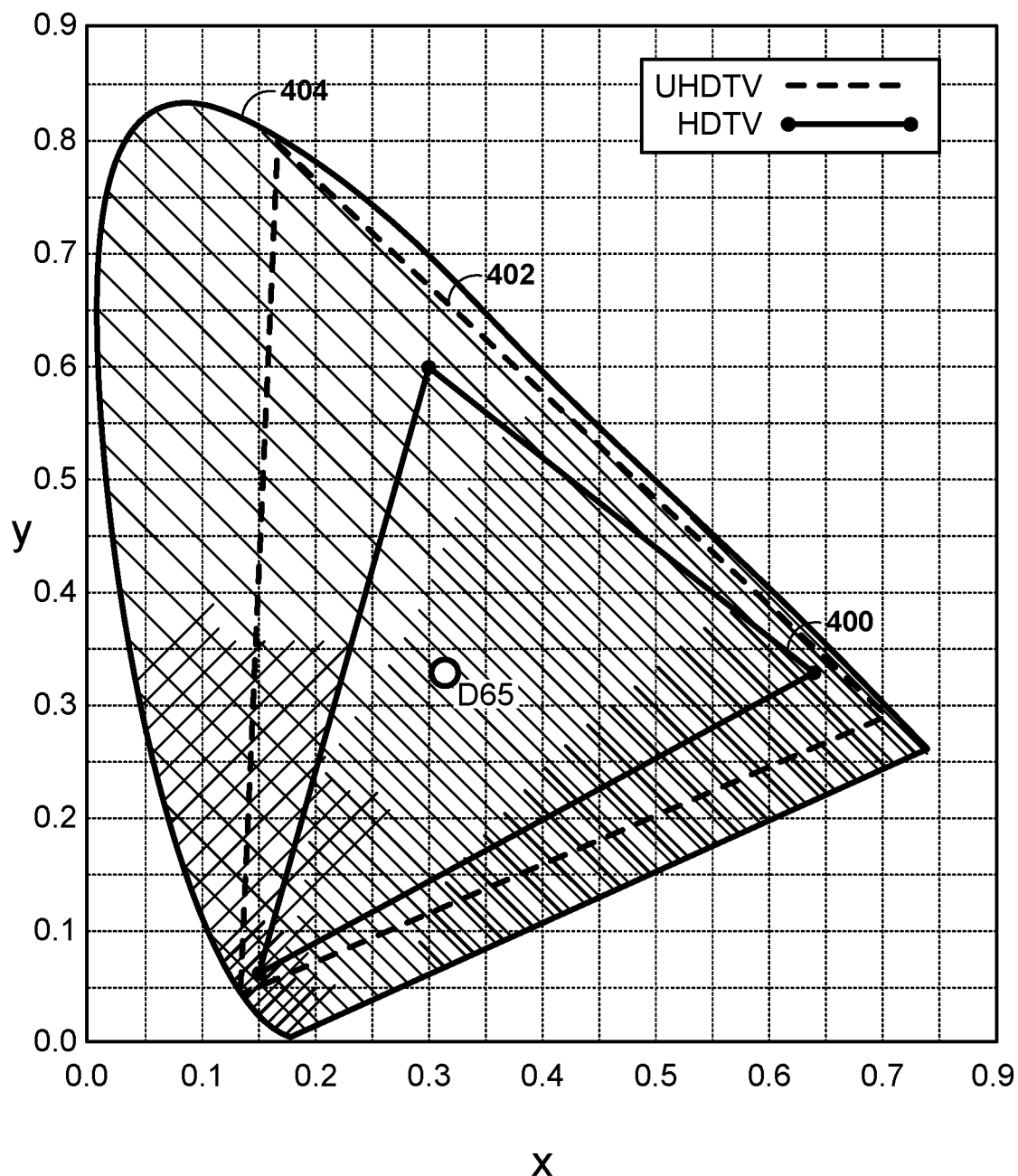
FIG. 6 is a conceptual diagram illustrating color gamuts.

FIG. 6 is a conceptual diagram illustrating an example color gamut graph. An aspect of a more realistic video experience other than HDR is the color dimension, which is conventionally defined by the color gamut. In the example of FIG. 6, a visual representation of SDR color gamut (triangle 400 based on the BT.709 color red, green and blue color primaries), and the wider color gamut that for UHDTV (triangle 402 based on the BT.2020 color red, green and blue color primaries). FIG. 6 also depicts the so-called spectrum locus (delimited by the tongue-shaped area 404), representing limits of natural colors. As illustrated by FIG. 6, moving from BT.709 (triangle 400) to BT.2020 (triangle 402) color primaries aim to provide UHDTV services with about 70% more colors. D65 specifies the white color for BT.709 and/or BT.2020 specifications.

A few examples of color gamut specifications for the DCI-P3, BT.709, and BT.2020 color spaces are shown in Table 1.

TABLE 1

| Colorimetry parameters for selected color spaces RGB color space parameters | | | | | | | | |
|---|---|---|---|---|---|---|---|---|
| | White point | | Primary colors | | | | | |
| Color space | $x_W$ | $y_W$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

ITU-R Rec. 709 defines parameters for high definition television (HDTV) such as Standard Dynamic Range (SDR) and standard color gamut (SCG) and ITU-R Rec.2020

Compression of HDR video data is now discussed. HDR/WCG is typically acquired and stored at a very high precision per component (which may even be stored with floating point precision), with the 4:4:4 chroma format and a very wide color space (e.g., XYZ). This representation targets high precision and may be (almost) mathematically lossless. However, this format features many redundancies and is not optimal for compression purposes. A lower precision format with an HVS-based assumption is typically utilized for state-of-the-art video applications.

Figure 7:
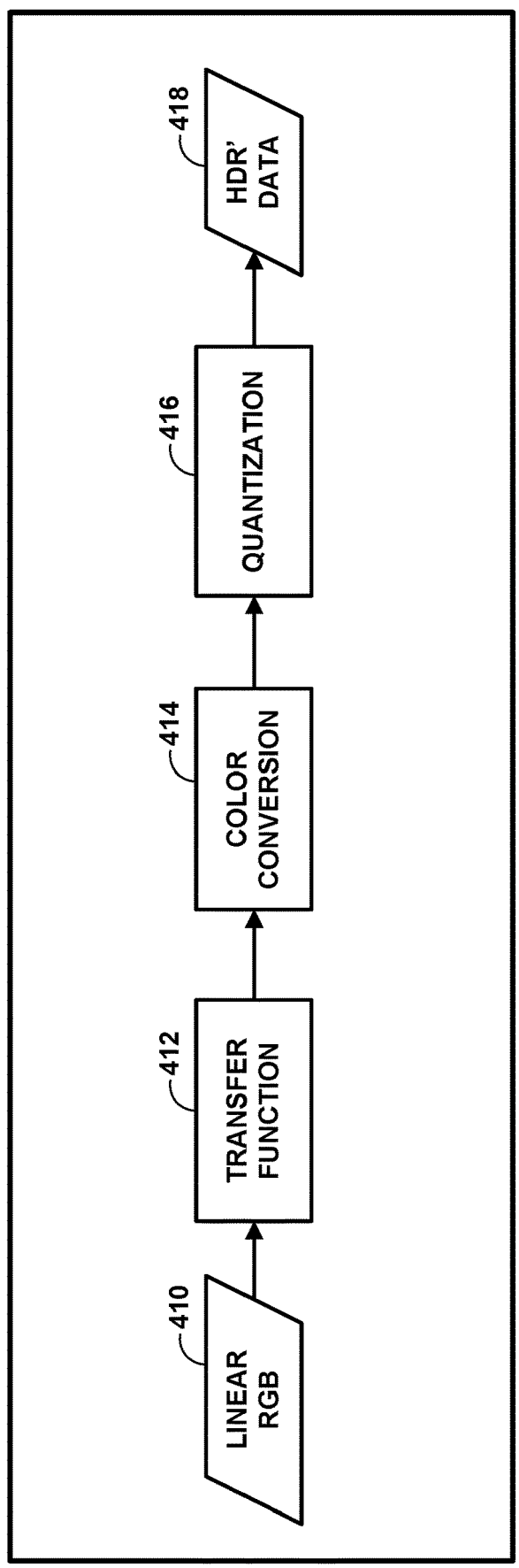
FIG. 7 is a block diagram illustrating an example of HDR/WCG conversion.

FIG. 7 is a block diagram illustrating an example format conversion technique. Video encoder 200 may perform the format conversion techniques to transform linear RGB 410 to HDR' data 418. These techniques may include 3 major elements as depicted in FIG. 7. These 3 elements include: 1) Non-linear transfer function (TF) 412 for dynamic range compacting; 2) Color Conversion 414 to a more compact or robust color space; and 3) Floating-to-integer representation conversion unit (Quantization 416).

The techniques of FIG. 7 may be performed by source device 12 (which may be an example of video encoder 200). Linear RGB data 410 may be HDR/WCG video data and may be stored with a floating point representation. Linear RGB data 410 may be compacted using TF 412 for dynamic range compacting. TF 412 may compact linear RGB data 410 using any number of non-linear transfer functions, e.g., the perceptual quantizer (PQ) TF as defined in SMPTE-2084. In some examples, color conversion process 414 converts the compacted data into a more compact or robust color space (e.g., a YUV or YCrCb color space) that is more suitable for compression by a hybrid video encoder. A hybrid video encoder is a video encoder that utilizes prediction when encoding video data. This more compact data is may be quantized using a floating-to-integer representation quantization unit 416 to produce converted HDR' data 418. In this example HDR' data 418 is in an integer representation. The HDR' data 418 is now in a format more suitable for compression by a hybrid video encoder (e.g., video encoder 200). The order of the processes depicted in FIG. 7 is given as an example, and may vary in other applications. For example, color conversion may precede the TF process. In addition, additional processing, e.g. spatial subsampling, may be applied to color components.

Figure 8:
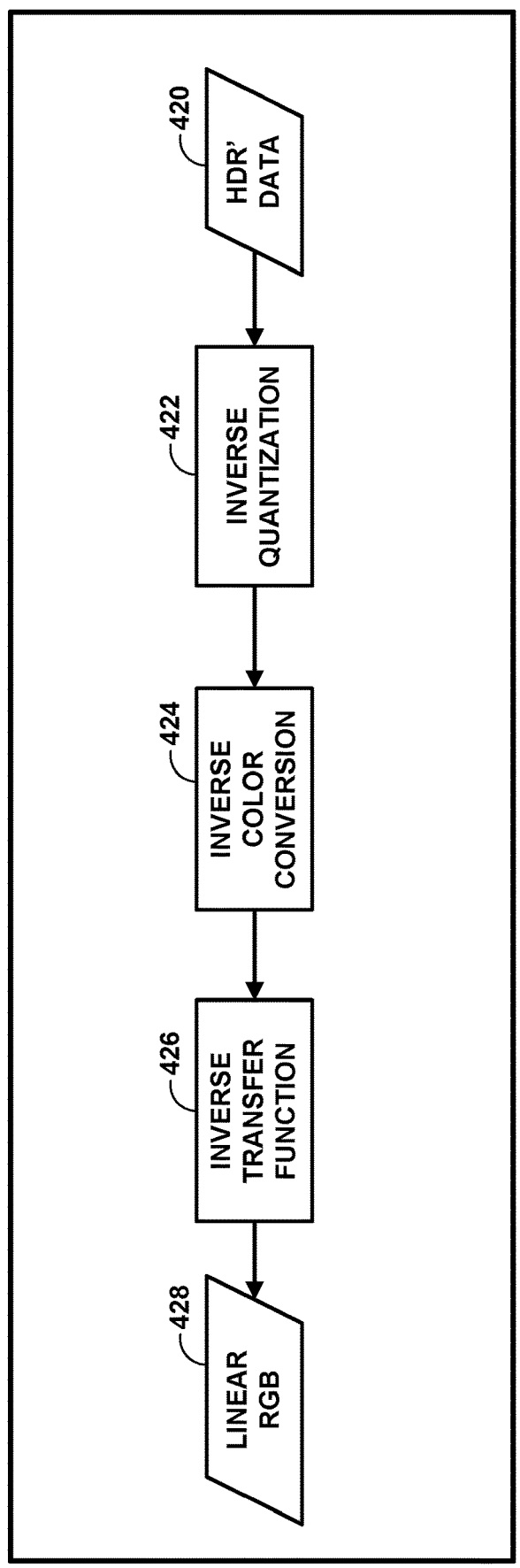
FIG. 8 is a block diagram illustrating an example of inverse HDR/WCG conversion.

FIG. 8 is a block diagram illustrating an example inverse format conversion technique. Video decoder 300 may perform the inverse conversion techniques of FIG. 8, including inverse quantization 422, inverse color conversion process 424, and inverse transfer function 426 to inverse transform HDR' data 420 to linear RGB 428.

The techniques of FIG. 8 may be performed by destination device 14 (which may be an example of video decoder 300). Converted HDR' data 420 may be obtained at destination device 14 through decoding video data using a hybrid video decoder (e.g., video decoder 300 applying HEVC techniques). A hybrid video decoder is a video decoder that utilizes prediction when decoding video data. Destination device 14 may inverse quantize HDR' data 420 through an inverse quantization unit. Then an inverse color conversion process 424 may be applied to the inverse quantized HDR' data. The inverse color conversion process 424 may be the inverse of color conversion process 414. For example, the inverse color conversion process 424 may convert the HDR' data from a YCrCb format back to an RGB format. Inverse transfer function 426 may be applied to the data to add back the dynamic range that was compacted by TF 412 to recreate the linear RGB data 428.

The high dynamic range of input RGB data in linear and floating point representation may be compacted with the utilized TF, e.g., PQ TF as defined in SMPTE-2084. After compacting, video encoder 200 may convert the compacted data into a target color space more suitable for compression, such as YCbCr. Video encoder 200 may quantize the color converted data to achieve integer representation. The order of the techniques of FIGS. 7 and 8, is provided as an example, and the order may vary in real-world applications, e.g., color conversion may precede the TF module, as well as additional processing, e.g., spatial subsampling may be applied to color components.

Figure 9:
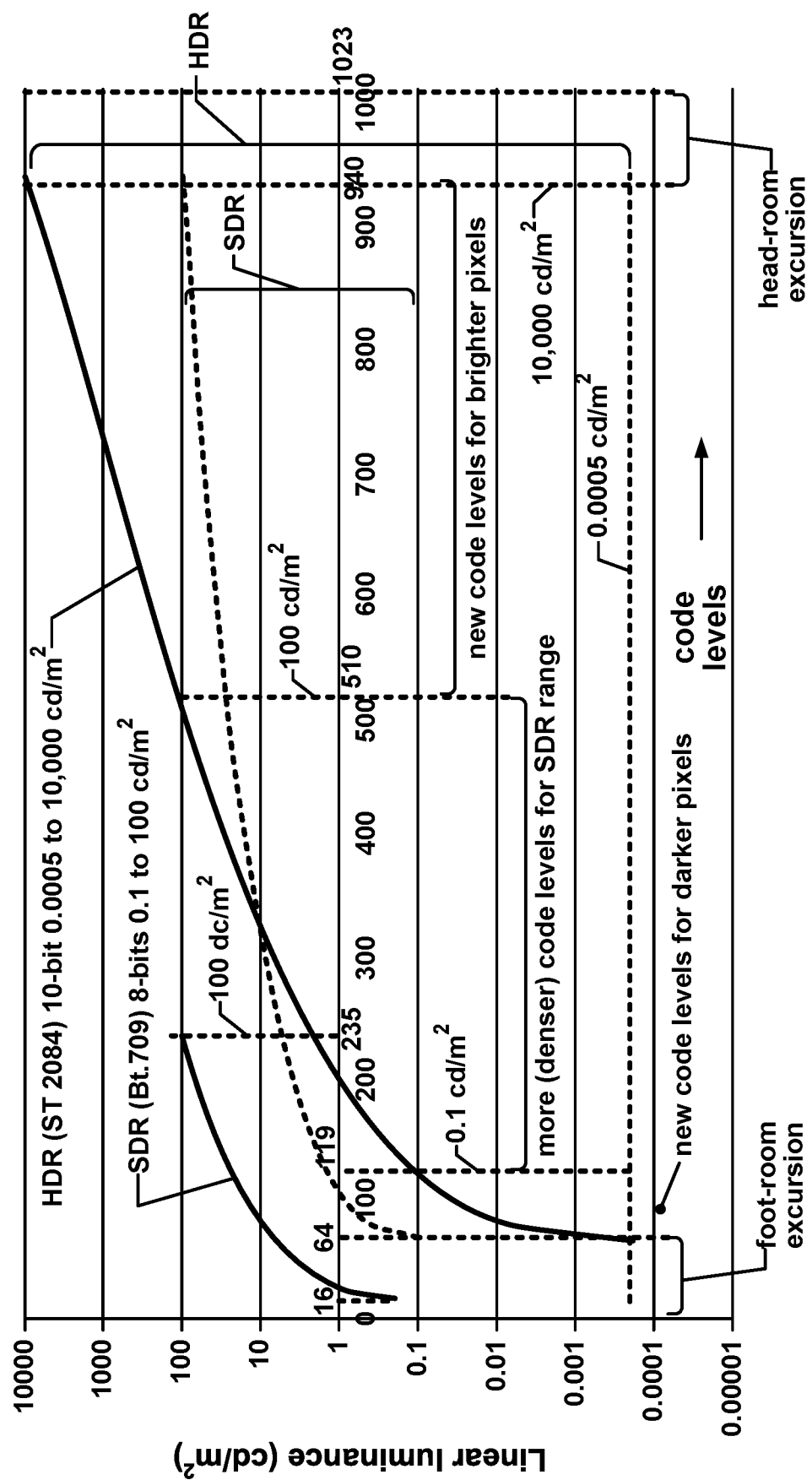
FIG. 9 is a conceptual diagram of an example of electro-optical transfer functions (EOTFs).

A TF is applied to the data to compact the dynamic range of the data and make it possible to represent the data with a limited number of bits. For example, video encoder 200 may apply a TF to compact the dynamic range of video data. This function is typically a one-dimensional (1D) non-linear function either reflecting inverse of electro-optical transfer function (EOTF) of the end-user display as specified for SDR in Rec.709 or approximating the HVS perception to brightness changes as for Perceptual Quantizer (PQ) TF specified in SMPTE-2084 for HDR. The inverse process of the OETF (optical-electro transfer function) is the EOTF (electro-optical transfer function), which maps the code levels back to luminance. FIG. 9 shows several examples of TFs.

The specification of ST2084 defined the EOTF application as follows. A TF is applied to a normalized linear R, G, B values, which results in a nonlinear representation of R'G'B'. ST2084 defines normalization by NORM=10000, which is associated with a peak brightness of 10000 nits (cd/m2).

$$R' = \text{PQ\_TF}(\max(0, \min(R/NORM, 1))) \qquad (1)$$

$$G' = \text{PQ\_TF}(\max(0, \min(G/NORM, 1)))$$

$$B' = \text{PQ\_TF}(\max(0, \min(B/NORM, 1)))$$

$$\text{with PQ\_TF}(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Figure 10:
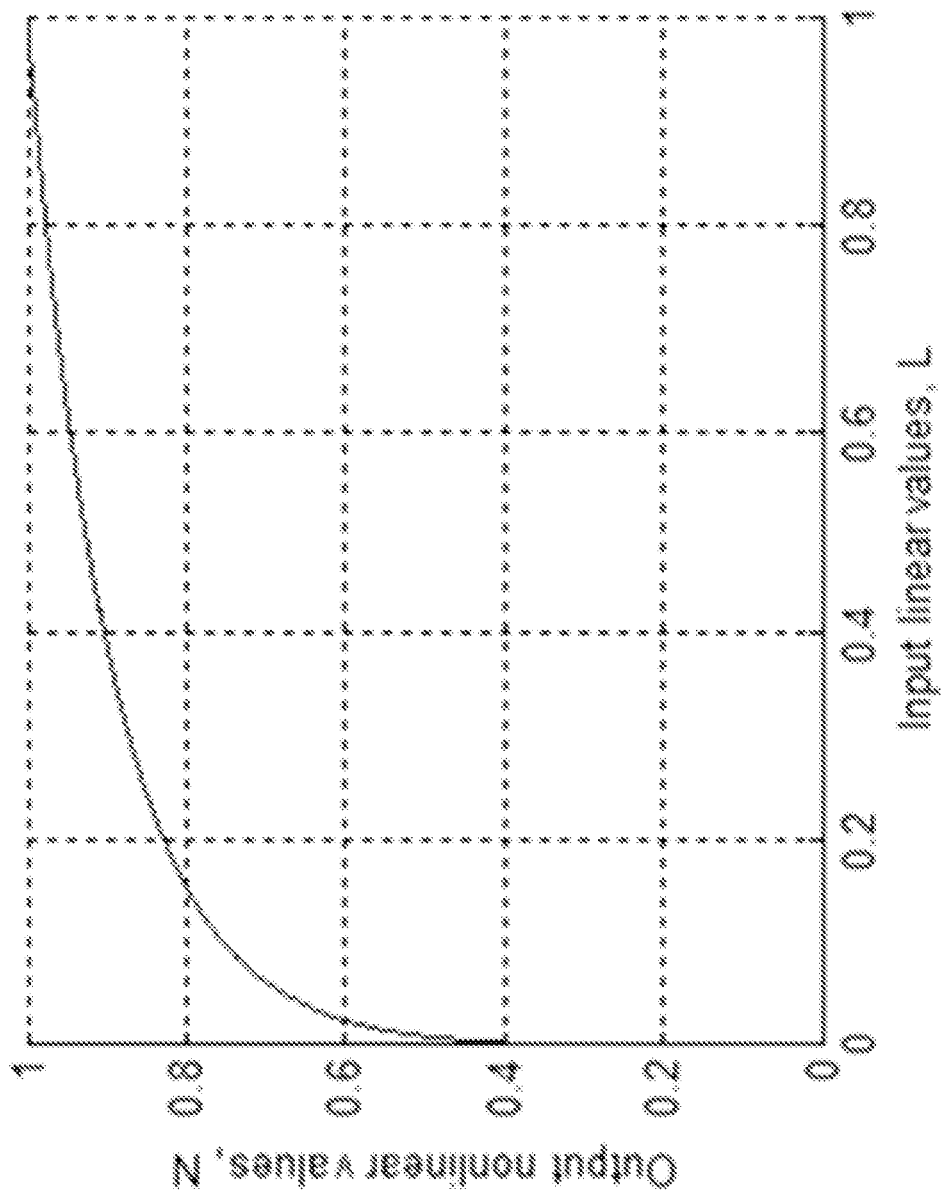
FIG. 10 is a conceptual diagram of an example of visualization of a perceptual quantizer (PQ) transfer function (TF) (ST2084 EOTF).

FIG. 10 is a graphical diagram illustrating example normalized output nonlinear values based on normalized linear input values. FIG. 10 depicts input values (linear color value) normalized to a range of 0 . . . 1 and normalized output values (nonlinear color value) using a PQ EOTF. As depicted in FIG. 10, 1 percent (low illumination) of dynamical range of the input signal is converted to 50% of dynamical range of output signal.

Typically, an EOTF is defined as a function with a floating point accuracy, thus no error is introduced to a signal with this non-linearity if an inverse TF (e.g., a so-called OETF) is applied. The inverse TF (OETF) specified in ST2084 is defined as an inversePQ function as follows:

$$R = 10000 * \text{inversePQ\_TF}(R') \quad (2)$$

$$G = 10000 * \text{inversePQ\_TF}(G')$$

$$B = 10000 * \text{inversePQ\_TF}(B')$$

$$\text{with inversePQ\_TF}(N) = \left(\frac{\max[(N^{1/m_2} - c_1), 0]}{c_2 - c_3 N^{1/m_2}}\right)^{1/m_1}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

With floating point accuracy, sequential application of EOTF and OETF may provide for perfect reconstruction without errors. However, this representation is not optimal for streaming or broadcasting services. A more compact representation with fixed bits accuracy of nonlinear R'G'B' data is described in following sections.

Note that EOTF and OETF is a subject of very active research currently, and TFs utilized in some HDR video coding systems may be different from ST2084.

Color transform techniques are now described. RGB data is typically utilized as input, since RGB data is typically produced by image capturing sensors. However, the RGB color space has high redundancy among RGB components and may not be optimal for a compact representation. To achieve a more compact and more robust representation, RGB components are typically converted to a more uncorrelated color space that is more suitable for compression, e.g., YCbCr. This color space separates the brightness in the form of luminance and color information in different less correlated components.

With modern video coding systems, the typically used color space is YCbCr, as specified in ITU-R BT.709 or ITU-R BT.709. The YCbCr color space in the BT.709 standard specifies the following conversion process from R'G'B' to Y'CbCr (non-constant luminance representation):

$$Y' = 0.2126 * R' + 0.7152 * G' + 0.0722 * B' \quad (3)$$

$$Cb = \frac{B' - Y'}{1.8556}$$

$$Cr = \frac{R' - Y'}{1.5748}$$

The above can also be implemented using the following approximate conversion that avoids the division for the Cb and Cr components:

$$Y' = 0.212600 * R' + 0.715200 * G' + 0.072200 * B'$$

$$Cb = -0.114572 * R' - 0.385428 * G' + 0.500000 * B'$$

$$Cr = 0.500000 * R' - 0.454153 * G' - 0.045847 * B' \quad (4)$$

The ITU-R BT.2020 standard specifies the following conversion process from R'G'B' to Y'CbCr (non-constant luminance representation):

$$Y' = 0.2627 * R' + 0.6780 * G' + 0.0593 * B' \quad (5)$$

$$Cb = \frac{B' - Y'}{1.8814}$$

$$Cr = \frac{R' - Y'}{1.474}$$

The above can also be implemented using the following approximate conversion that avoids the division for the Cb and Cr components:

$$Y' = 0.262700 * R' + 0.678000 * G' + 0.059300 * B'$$

$$Cb = -0.139630 * R' - 0.360370 * G' + 0.500000 * B'$$

$$Cr = 0.500000 * R' - 0.459786 * G' - 0.040214 * B' \quad (6)$$

It should be noted, that both color spaces remain normalized. Therefore, for the input values normalized in the range 0 . . . 1, the resulting values are mapped to the range 0 . . . 1. Generally, color transforms implemented with floating point accuracy provide perfect reconstruction, thus this process may be lossless.

Quantization (or fixed point conversion) is now described in more detail. All processing stages described above may be typically implemented in floating point accuracy representation, and thus may be considered lossless. However, floating point accuracy can be considered expensive for most consumer electronics applications. Therefore, input data in a target color space may be converted to a target bit-depth fixed point accuracy and thereby save bandwidth and memory. Certain studies show that 10-12 bits accuracy in combination with the PQ TF is sufficient to provide HDR data of 16 f-stops with distortion below the Just-Noticeable Difference (JND). In general, a JND is the amount of something (e.g., video data) that must be changed in order for a difference to be noticeable (e.g., by the HVS). Data represented with 10 bits accuracy can be further coded with most of the state-of-the-art video coding solutions. This conversion process includes signal quantization and is an element of lossy coding and is a source of inaccuracy introduced to converted data.

An example of such quantization applied to code words in a target color space (e.g., YCbCr) is shown below. Input values YCbCr represented in floating point accuracy may be converted into a signal of fixed bit-depth BitDepthY for the Y value and BitDepthC for the chroma values (Cb, Cr). For example, video encoder 200 may convert input values from floating point accuracy to a signal of a fixed bit-depth.

$$D_Y = \text{Clip1}_Y(\text{Round}((1 << (\text{BitDepth}_Y - 8)) * (219 * Y' + 16)))$$

$$D_{Cb} = \text{Clip1}_C(\text{Round}((1 << (\text{BitDepth}_C - 8)) * (224 * Cb + 128)))$$

$$D_{Cr} = \text{Clip1}_C(\text{Round}((1 << (\text{BitDepth}_C - 8)) * (224 * Cr + 128))) \quad (7)$$

with

Round(x) = Sign(x) * Floor(Abs(x) + 0.5)

Sign(x) = −1 if x<0, 0 if x=0, 1 if x>0

Floor(x) the largest integer less than or equal to x

Abs(x) = x if x>=0, −x if x<0

Clip1$_Y$(x) = Clip3(0, (1<<BitDepth$_Y$)−1, x)

$Clip1_C(x)=Clip3(0, (1<<BitDepth_C)-1, x)$ $Clip3(x,y,z)=x$ if $z<x$, $y$ if $z>y$, $z$ otherwise In the document, Dynamic Range Adjustment SEI to enable High Dynamic Range video coding with Backward-Compatible Capability, D. Rusanovskyy, A. K. Ramasubramonian, D. Bugdayci, S. Lee, J. Sole, M. Karczewicz, VCEG document COM16-C 1027-E, September 2015, the authors proposed to implement DRA as a piece-wise linear function f(x) that is defined for a group of non-overlapped dynamic range partitions (ranges) {Ri} of input value x, where i is an index of the range with range of 0 to N−1, inclusive, and where N is the total number of ranges {Ri} utilized for defining the DRA function. For example, assume that ranges of the DRA are defined by minimum and a maximum x value that belong to the range Ri, e.g. [$x_i$, $x_{i+1}$−1], where $x_i$ and $x_{i+1}$ denote minimum value of the ranges $R_i$ and $R_{i+1}$ respectively. Applied to the Y color component of the video (luma), a DRA function Sy is defined through a scale $S_{y,i}$ and an offset $O_{y,i}$, which are applied to every $x \in [x_i, x_{i+1}-1]$, thus $S_y=\{S_{y,i}, O_{y,i}\}$.

With this, for any Ri, and every $x \in [x_i, x_{i+1}-1]$, the output value X is calculated as follows:

$$X = S_{y,i} * (x - O_{y,i}) \tag{8}$$

For the inverse DRA mapping process, for luma component Y conducted at the decoder (e.g., video decoder 300), the DRA function Sy is defined by an inverse of scale S_(y,i) and offset O_(y,i) values which are applied to every $X \in [X\_i, X\_(i+1)-1]$.

Thus, for any Ri, and every $X \in [X_i, X_{i+1}-1]$, a reconstructed value x is calculated as follows:

$$x = X/S_{y,i} + O_{y,i} \tag{9}$$

The forward DRA mapping process (e.g., conducted by video encoder 200) for chroma components Cb and Cr are defined as follows: an example is given with term "u" denoting a sample of a Cb color component that belongs to a range Ri, $u \in [u_i, u_{i+1}-1]$, thus $S_u=\{S_{u,i}, O_{u,i}\}$:

$$U = S_{u,i} * (u - O_{y,i}) + \text{Offset} \tag{10}$$

where Offset is equal to $2^{(bitdepth-1)}$ denotes the bi-polar Cb, Cr signal offset.

The inverse DRA mapping process conducted at the decoder (e.g., by video decoder 300) for chroma components Cb and Cr were defined as follows: an example is given with the U term denoting a sample of a remapped Cb color component which belongs to the range Ri, $U \in [U_i, U_{i+1}-1]$:

$$u = (U - \text{Offset})/S_{u,i} + O_{y,i} \tag{11}$$

where Offset is equal to $2^{(bitdepth-1)}$ denotes the bi-polar Cb, Cr signal offset.

Luma-driven chroma scaling (LCS) is now described. LCS was initially proposed in JCTVC-W0101 HDR CE2: Report on CE2.a-1 LCS, A. K. Ramasubramanian, J. Sole, D. Rusanovskyy, D. Bugdayci, M. Karczewicz. In that paper, a technique to adjust chroma information, e.g. Cb and Cr, by exploiting brightness information associated with the processed chroma sample was disclosed. Similarly, to the DRA approach discussed above, the LCS proposal was to apply to a chroma sample, a scale factor S_u for Cb and S_(v,i) for Cr. However, instead of defining DRA function as piece-wise linear function S_u={S_(u,i),O_(u,i)} for a set of ranges {R_i} accessible by chroma value u or v as in Equations (8) and (9), the LCS approach proposed to utilize a luma value Y to derive a scale factor for a chroma sample.

Video encoder 200 may perform forward LCS mapping of the chroma sample u (or v) through the following formula:

$$U = S_{u,i}(Y) * (u - \text{Offset}) + \text{Offset} \tag{12}$$

Video decoder 300 may perform the inverse LCS process conducted through the following formula:

$$u = (U - \text{Offset})/S_{u,i}(Y) + \text{Offset} \tag{13}$$

In more details, for a given pixel located at (x, y), chroma samples Cb(x, y) or Cr(x, y) may be scaled with a factor derived from the pixel's LCS function SCb (or SCr) accessed by the pixel's luma value Y'(x, y).

With the forward LCS, for chroma samples, Cb (or Cr) values, and their associated luma value Y' may be an input to the chroma scale function $S_{Cb}$ (or $S_{Cr}$) and Cb or Cr may be converted into Cb' and Cr' as shown in Equation 14. Video decoder 300 may apply the inverse LCS, and reconstructed Cb' or Cr' may be converted to Cb, or Cr as it shown in Equation (15).

$$Cb'(x, y) = S_{Cb}(Y'(x, y)) * Cb(x, y), \tag{14}$$

$$Cr'(x, y) = S_{Cr}(Y'(x, y)) * Cr(x, y)$$

$$Cb(x, y) = \frac{Cb'(x, y)}{S_{Cb}(Y'(x, y))} \tag{15}$$

$$Cr(x, y) = \frac{Cr'(x, y)}{S_{Cr}(Y'(x, y))}$$

Figure 11:
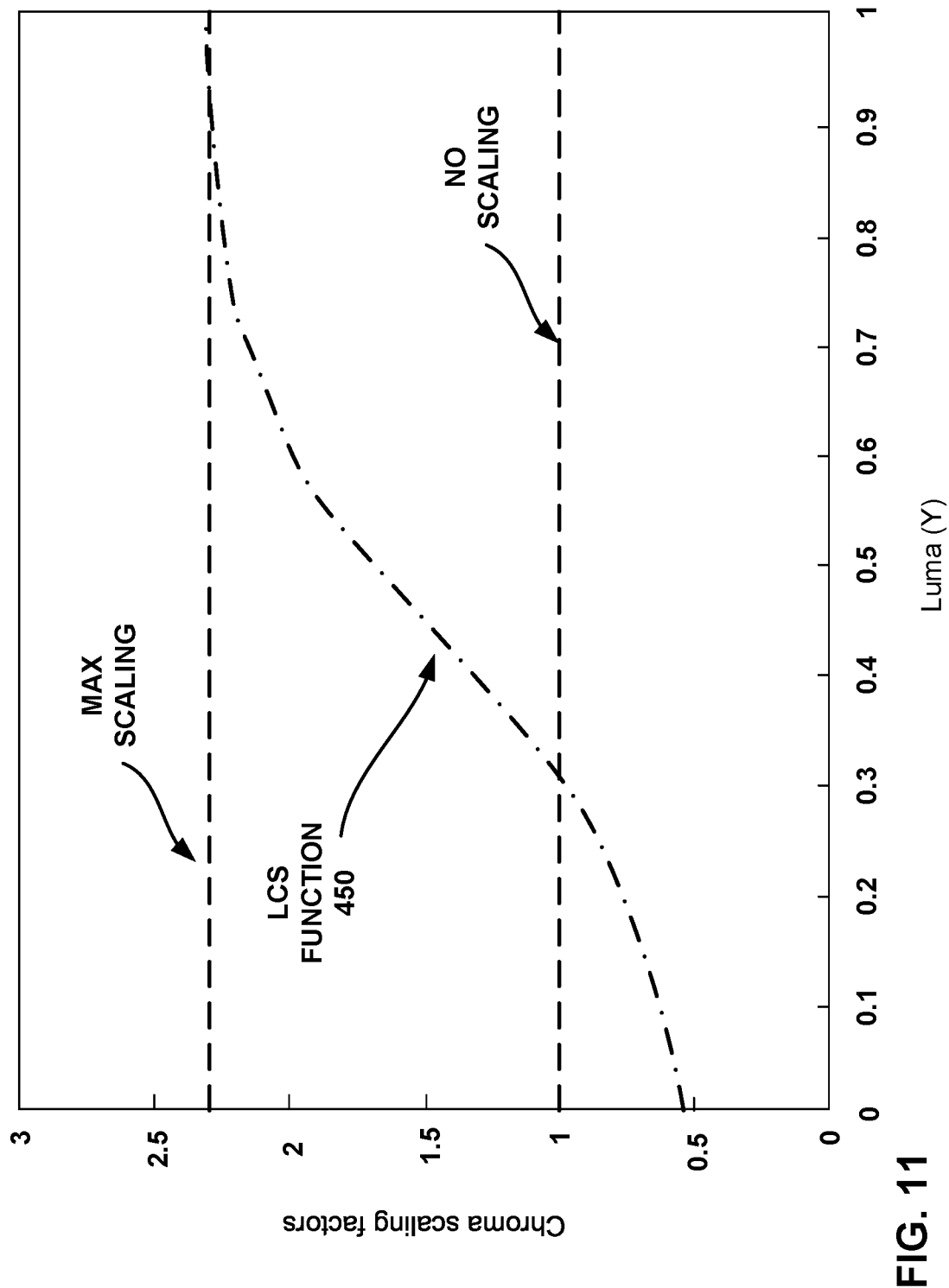
FIG. 11 is a conceptual diagram of an example of a luma-driven chroma scaling (LCS) function.

FIG. 11 is a graphical diagram illustrating an example of an LCS function. With the LCS function 450 in the example of FIG. 11, chroma components of pixels with smaller values of luma are multiplied with smaller scaling factors.

The relationship between DRA sample scaling and quantization parameters of video codecs is now discussed. To adjust a compression ratio at encoders (e.g., video encoder 200), block transform-based video coding schemes such as HEVC utilize a scalar quantizer which is applied to block transform coefficients.

$$Xq = X/\text{scalerQP}$$

where Xq is a quantized code value of the transform coefficient X produced by applying a scaler, scalerQP, derived from a QP parameter. In most codecs, the quantized code value is approximated to an integer value (e.g., by rounding). In some codecs, the quantization may be a different function which depends not just on the QP but also on other parameters of the codec.

A scaler value scalerQP is controlled with a QP with the relationship between QP and a scalar quantizer defined as follows, where k is a known constant:

$$\text{scalerQP} = k*2^{(QP/6)} \tag{16}$$

The inverse function (which video decoder 300 may apply) defines relationship between scalar quantizer applied to transform coefficients and QP of the HEVC as follows:

$$QP = \ln(\text{scalerQP}/k)*6/\ln(2); \tag{7}$$

Respectively, an additive change in the QP value, e.g., deltaQP, would result in a multiplicative change in the scalerQP value applied to the transform coefficients.

DRA is effectively applying a scaleDRA value to the pixel sample values, and, taking into consideration transform properties, can be combined with scalerQP values as follows:

$$Xq = T(\text{scaleDRA}*x)/\text{scaleQP}$$

where Xq are quantized transform coefficients produced by transform T of the scaled x sample values and scaled with scaleQP applied in a transform domain. Thus, applying multiplicator scaleDRA in the pixel domain results in an effective change of the scaler quantizer scaleQP, which is applied in the transform domain. This in turn can be interpreted in the additive change of QP parameters applied to the current processed block of data:

$$dQP=\log 2(scaleDRA)*6; \qquad (18)$$

where dQP is an approximate QP offset introduced by HEVC by deploying DRA on the input data.

Chroma QP dependency on the luma QP value is now discussed. Some of state-of-the-art video coding designs, such as HEVC and newer designs, may utilize a pre-defined dependency between luma and chroma QP values effectively applied to process a currently coded block Cb. Such a dependency may be utilized to achieve an optimal (or relatively optimal) bitrate allocation between luma and chroma components.

An example of such dependency is represented by Table 8-10 of the HEVC specification from the paper entitled "Dynamic Range Adjustment SEI to enable High Dynamic Range video coding with Backward-Compatible Capability" discussed above, where QP values applied for decoding of the chroma samples are derived from QP values utilized for decoding luma samples. The relevant section where the chroma QP value is derived based on the QP value of the corresponding luma sample (e.g., the QP value applied to the block or TU that the corresponding luma sample belongs to), and chroma QP offsets of HEVC specification is reproduced below:

When ChromaArrayType is not equal to 0, the following applies:
  The variables $qP_{Cb}$ and $qP_{Cr}$ are derived as follows:
  If tu_residual_act_flag[xTbY][yTbY] is equal to 0, the following applies:

$qPi_{Cb}=\text{Clip3}(-QpBd\text{Offset}_C, 57, Qp_Y+pp\text{-}s\_cb\_qp\_\text{offset}+\text{slice}\_cb\_qp\_\text{offset}+CuQp\text{Offset}_{Cb})$ (8-287)

$qPi_{Cr}=\text{Clip3}(-QpBd\text{Offset}_C, 57, Qp_Y+pps\_cr\_qp\_\text{offset}+\text{slice}\_cr\_qp\_\text{offset}+CuQp\text{Offset}_{Cr})$ (8-288)

Otherwise (tu_residual_act_flag[xTbY][yTbY] is equal to 1), the following applies:

$qPi_{Cb}=\text{Clip3}(-QpBd\text{Offset}C, 57, Qp_Y+Pps\text{Act}Qp\text{Offset}Cb+\text{slice}\_act\_cb\_qp\_\text{offset}+CuQp\text{Offset}Cb)$ (8-289)

$qPi_{Cr}=\text{Clip3}(-QpBd\text{Offset}C, 57, Qp_Y+Pps\text{Act}Qp\text{Offset}Cr+\text{slice}\_act\_cr\_qp\_\text{offset}+CuQp\text{Offset}Cr)$ (8-290)

If ChromaArrayType is equal to 1, the variables $qP_{Cb}$ and $qP_{Cr}$ are set equal to the value of $Qp_C$ as specified in Table 8-10 based on the index qPi equal to $qPi_{Cb}$ and $qPi_{Cr}$, respectively.
  Otherwise, the variables $qP_{Cb}$ and $qP_{Cr}$ are set equal to Min(qPi, 51), based on the index qPi equal to $qPi_{Cb}$ and $qPi_{Cr}$, respectively.
  The chroma quantization parameters for the Cb and Cr components, $Qp'_{Cb}$ and $Qp'_{Cr}$, are derived as follows:

$Qp'_{Cb}=qP_{Cb}+QpBd\text{Offset}_C$ (8-291)

$Qp'_{Cr}=qP_{Cr}+QpBd\text{Offset}_C$ (8-292)

FIG. 12 is a conceptual diagram illustrating Table 8-10 of the HEVC specification. Table 8-10 details the specification of $Qp_C$ as a function of qPi for ChromaArrayType equal to 1.

Derivation of chroma scale for DRA is now discussed. In video coding systems (such as video encoder 200 or video decoder 300) employing both the uniform scalar quantization in transform domain and pixel domain scaling with DRA, derivation of the scale DRA value applied to chroma samples $(S_X)$ may be dependent on following:
  $S_Y$: Luma scale value of the associated luma sample
  $S_{CX}$: Scale derived from the gamut of the content, where CX stands for Cb or Cr as applicable
  $S_{corr}$: correction scale term based for accounting for mismatch in transform coding and DRA scaling, e.g., to compensate dependency introduced by Table 8-10 of the HEVC $$S_X=\text{fun}(S_Y, S_{CX}, S_{corr}).$$

One example is a separable function defined as follows:
$S_x=f1(S_Y)*f2(S_{CX})*f3(S_{corr})$ Bumping operations are now described. The decoded picture buffer (DPB), e.g., DPB 218 or DPB 314, maintains a set of pictures/frames that may be used as a reference(s) for inter-picture prediction in the coding loop of the codec, e.g., video encoder 200 or video decoder 300. Depending on the coding state, one or more pictures may be output for consumption by external application or be read by an external application. Depending on a coding order, DPB size or other condition, a picture that has no longer has a use in the coding loop and was consumed by an external application may be removed from the DPB or be replaced by a newer reference picture. The process to output of pictures from the DPB and potential removal of pictures from the DPB is referred to as a bumping process. An example of a bumping process defined for HEVC is quoted below:

C.5.2.4 "Bumping" Process
The "bumping" process consists of the following ordered steps:
  1. The picture that is first for output is selected as the one having the smallest value of PicOrderCntVal of all pictures in the DPB marked as "needed for output".
  2. The picture is cropped, using the conformance cropping window specified in the active SPS for the picture, the cropped picture is output, and the picture is marked as "not needed for output".
  3. When the picture storage buffer that included the picture that was cropped and output contains a picture marked as "unused for reference", the picture storage buffer is emptied.
    NOTE—For any two pictures picA and picB that belong to the same CVS and are output by the "bumping process", when picA is output earlier than picB, the value of PicOrderCntVal of picA is less than the value of PicOrderCntVal of picB.

Bumping operations with DRA are now described. DRA normative postprocessing was adopted in the draft text of the MPEG5 EVC specification in a form of modified bumping process. An extract of the specification text clauses covering the bumping process with proposed changes are shown below. The beginning of changes are marked <CHANGE> and the end of changes are marked </CHANGE>. Note that FIG. C2 mentioned below is FIG. 13 in this disclosure and changes are also marked in FIG. 13.

Figure 13:
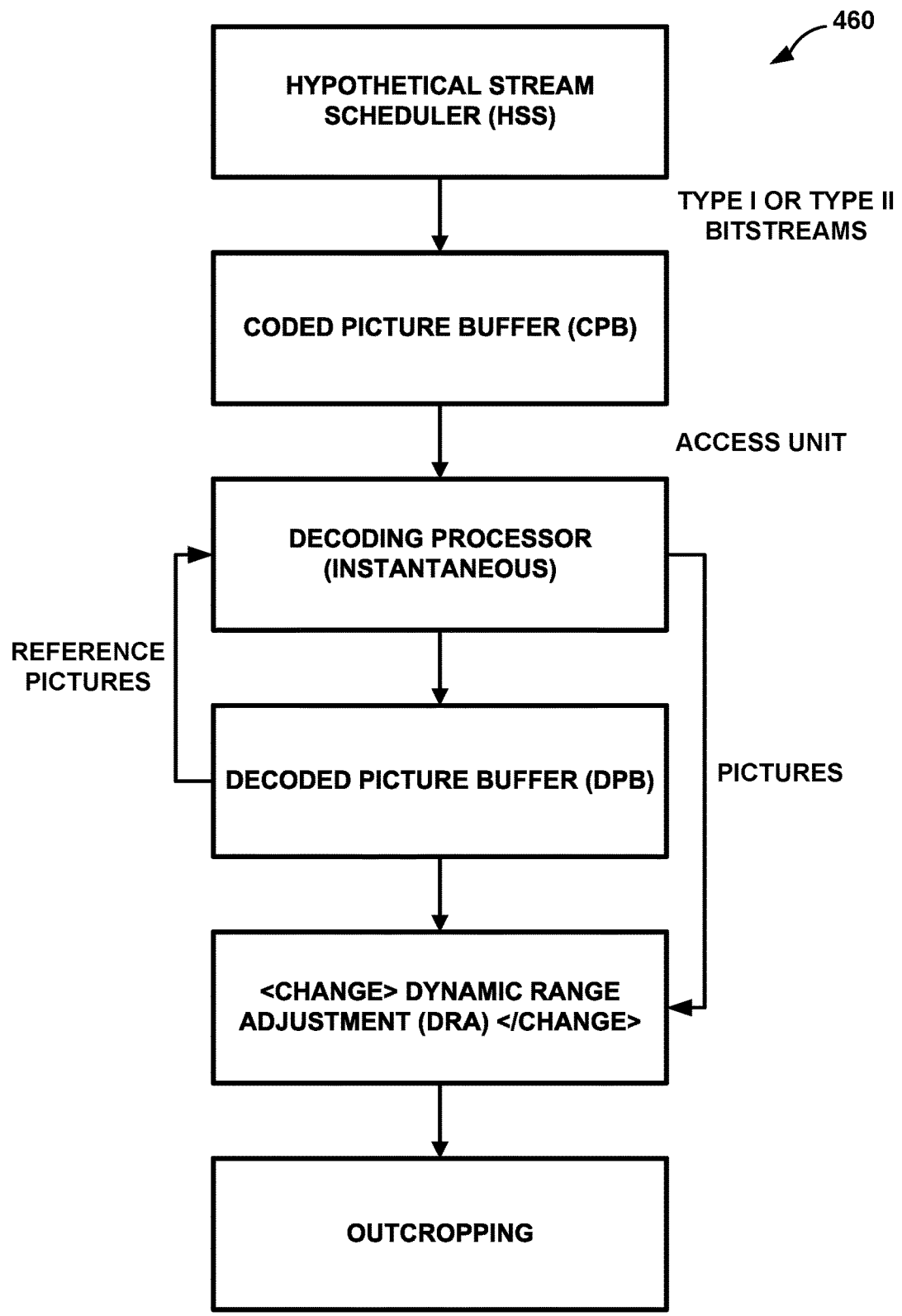
FIG. 13 is a conceptual diagram of an HDR buffer model.

Annex C Hypothetical Reference Decoder
The HRD contains a coded picture buffer (CPB), an instantaneous decoding process, a decoded picture buffer (DPB), output DRA and cropping as shown in FIG. C2. [hypothetical reference decoder 460 shown in FIG. 13].

The operation of the DPB is specified in subclause C.3. The output DRA process and cropping are specified in subclauses C.3.3 and C.5.2.4.

C.3.3 Picture Decoding and Output

Picture n is decoded and its DPB output time $t_{o,dpb}(n)$ is derived by $$t_{o,dpb}(n)=t_r(n)+t_c*dpb\_output\_delay(n) \quad (C-12)$$

The output of the current picture is specified as follows.

If $t_{o,dpb}(n)=t_r(n)$, the current picture is output.

Otherwise ($t_{o,dpb}(n)>t_r(n)$), the current picture is output later and will be stored in the DPB (as specified in subclause C.2.4) and is output at time $t_{o,dpb}(n)$ unless indicated not to be output by the decoding or inference of no_output_of_prior_pics_flag equal to 1 at a time that precedes $t_{o,dpb}(n)$.

<CHANGE> The output picture shall be derived by invoking the DRA process specified in subclause 8.9.2 and cropped, using the cropping rectangle specified in the SPS for the sequence. </CHANGE>

When picture n is a picture that is output and is not the last picture of the bitstream that is output, the value of $\Delta t_{o,dpb}(n)$ is defined as:

$$\Delta t_{o,dpb}(n)=t_{o,dpb}(n_n)-t_{o,dpb}(n) \quad (C-13)$$

where $n_n$ indicates the picture that follows after picture n in output order.

The decoded picture is stored in the DPB.

C.5.2.4 "Bumping" Process

The "bumping" process is invoked in the following cases.

The current picture is an IDR picture and no_output_of_prior_pics_flag is not equal to 1 and is not inferred to be equal to 1, as specified in subclause C.5.2.2.

There is no empty picture storage buffer (i.e., DPB fullness is equal to DPB size) and an empty picture storage buffer is needed for storage of a decoded picture, as specified in subclause.

The "bumping" process consists of the following ordered steps: <CHANGE>

4. The picture that is first for output is selected as the one having the smallest value of PicOrderCntVal of all pictures in the DPB marked as "needed for output".

The selected picture consists of a pic_width_in_luma_samples by pic_height_in_luma_samples array of luma samples currPicL and two PicWidthInSamplesC by PicHeightInSamplesC arrays of chroma samples currPicCb and currPicCr. The sample arrays currPicL, currPicCb and currPicCr correspond to decoded sample arrays $S_L$, $S_{Cb}$ and $S_{Cr}$.

5. When dra_table_present_flag is equal to 1, DRA derivation process specified in clause 8.9 is invoked with selected picture as input and output picture as output, otherwise, the sample arrays of output picture are initialized by the sample arrays of the selected picture. </CHANGE>

6. The output picture is cropped, using the conformance cropping window specified in the active SPS for the picture, the cropped picture is output, and the picture is marked as "not needed for output".

7. When the picture storage buffer that included the picture that was <CHANGE>mapped, </CHANGE>cropped and output contains a picture marked as "unused for reference", the picture storage buffer is emptied.

Adaption parameter set (APS) signaling of DRA data is now discussed. The MPEG5 EVC specification defines that DRA parameters are signaled in an APS. Syntax and semantic of DRA parameters are provided below:

| | Descriptor |
|---|---|
| seq_parameter_set_rbsp( ) { | |
| ... | |
|   sps_dra_flag | u(1) |
| ... | |
| pic_parameter_set_rbsp( ) { | |
| ... | |
|   if( sps_dra_flag ) { | |
|     pic_dra_enabled_present_flag | u(1) |
|     if( pic_dra_Enabled_present_flag ) { | |
|       pic_dra_enabled_flag | u(1) |
|       if( pic_dra_enabled_flag ) | |
|         pic_dra_aps_id | u(3) |
|     } | |
|   } | |
| ... | |

| | Descriptor |
|---|---|
| adaptation_parameter_set_rbsp( ) { | |
|   adaptation_parameter_set_id | u(5) |
|   aps_params_type | u(3) |
|   if( aps_params_type == ALF_APS ) | |
|     alf_data( ) | |
|   else if( aps_params_type == DRA_APS ) | |
|     <CHANGE> dra_data( ) | </CHANGE> |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

DRA Data Syntax

| | Descriptor |
|---|---|
| dra_data( ) { | |
|   dra_descriptor1 | u(4) |
|   dra_descriptor2 | u(4) |
|   dra_number_ranges_minus1 | ue(v) |
|   dra_equal_ranges_flag | u(1) |
|   dra_global_offset | u(v) |
|   if( dra equal ranges flag ) | u(1) |
|     dra_delta_range[ 0 ] | u(v) |
|   Else | |
|   for( j = 0; j <= dra_number_ranges_minus1; j++) | |
|     dra_delta_range [j ] | u(v) |
|   for( j = 0; j <= dra_number_ranges_minus1; j++) | |
|     dra_scale_value[ j ] | u(v) |
|   dra_cb_scale_value | u(v) |
|   dra_cr_scale_value | u(v) |
|   dra_table_idx | ue(v) |
| } | | sps_dra_flag equal to 1 specifies that the dynamic range adjustment mapping on output samples is used. sps_dra_flag equal to 0 specifies that dynamic range adjustment mapping on output samples is not used.

pic_dra_enabled_present_flag equal to 1 specifies that pic_dra_enabled_flag present in the PPS. pic_dra_enabled_present_flag equal to 0 specifies that pic_dra_enabled_flag is not present in the PPS. When pic_dra_enabled_present_flag is not present, it is inferred to be equal to 0.

pic_dra_enabled_flag equal to 1 specifies that DRA is enabled for all decoded picture referring to the PPS. pic_dra_enabled_flag equal to 0 specifies that DRA is note enabled for all decoded pictures referring to the PPS. When not present, pic_dra_enabled_flag is inferred to be equal to 0.

pic_dra_aps_id specifies the adaptation_parameter_set_id of the DRA APS that is enabled for decoded pictures referring to the PPS.

adaptation_parameter_set_id provides an identifier for the APS for reference by other syntax elements.

aps_params_type specifies the type of APS parameters carried in the APS as specified in Table 2.

TABLE 2

APS parameters type codes and types of APS parameters

| aps_params_type | Name of aps_params_type | Type of APS parameters |
|---|---|---|
| 0 | ALF_APS | ALF parameters |
| 1 | DRA_APS | DRA parameters |
| 2..7 | Reserved | Reserved | dra_descriptor1 shall be in the range of 0 to 15, inclusive. In the current version of the specification value of syntax element dra_descriptor1 is restricted to 4, other values are reserved for future use.

dra_descriptor2 specifies the accuracy of the fractional part of the DRA scale parameters signaling and the reconstruction process. The value of dra_descriptor2 shall be in the range of 0 to 15, inclusive. In the current version of the specification, the value of syntax element dra_descriptor2 is restricted to 9, other values are reserved for future use.

The variable numBitsDraScale is derived as follows:

numBitsDraScale=dra_descriptor1+dra_descriptor2 dra_number_ranges_minus1 plus 1 specifies the number of ranges signalled to describe the DRA table. The value of dra_number_ranges_minus1 shall be in the range of 0 to 31, inclusive.

dra_equal_ranges_flag equal to 1 specifies that the DRA table is derived using equal-sized ranges, with size specified by the syntax element dra_delta_range[0]. dra_equal_ranges_flag equal to 0 specifies that the DRA table is derived using dra_number_ranges, with the size of each of the ranges specified by the syntax element dra_delta_range[j].

dra_global_offset specifies that the starting codeword position utilized to derive DRA table and initializes the variable inDraRange[0] as follows:

inDraRange[0]=dra_global_offset

The number of bits used to signal dra_global_offset is BitDepth$_Y$ bits.

dra_delta_range[j] specifies the size of the j-th range in codewords which is utilized to derive the DRA table. The value of dra_delta_range[j] shall be in the range of 1 to (1<<BitDepth$_Y$)−1, inclusive.

The variable inDraRange[j] for j in the range of 1 to dra_number_ranges_minus1, inclusive, are derived as follows:

inDraRange[*j*]=inDraRange[*j*−1]+(dra_equal_ranges_flag==1) ?

dra_delta_range[0]:dra_delta_range[j]

It is a requirement of the bitstream conformance that inDraRange[j] shall be in the range 0 to (1<<BitDepth$_Y$)−1.

dra_scale_value[j] specifies the DRA scale value associated with j-th range of the DRA table. The number of bits used to signal dra_scale_value[j] is equal to numBitsDraScale.

dra_cb_scale_value specifies the scale value for chroma samples of Cb component utilized to derive the DRA table. The number of bits used to signal dra_cb_scale_value is equal to numBitsDraScale. In the current version of the specification, the value of syntax element dra_cb_scale_value shall be less then 4<<dra_descriptor2, other values are reserved for future use.

dra_cr_scale_value specifies the scale value for chroma samples of Cr component utilized to derive the DRA table. The number of bits used to signal dra_cr_scale_value is equal to numBitsDraScale bits. In the current version of the specification value of syntax element dra_cb_scale_value shall be less then 4<<dra_descriptor2, other values are reserved for future use.

The values of dra_scale_value[j], dra_cb_scale_value and dra_cr_scale_value shall not be equal to 0.

dra_table_idx specifies the access entry of the ChromaQpTable utilized to derived the chroma scale values. The value of dra_table_idx shall be in the range of 0 to 57, inclusive.

Some video encoders signal DRA data as a separate network abstraction layer (NAL) unit, with a particular applicable APS identifier being signaled at the picture parameter set (PPS) for all pictures referring to that PPS. Video decoder 300 may apply an inverse DRA process at the output process which may be decoupled from the decoding process in time, for example in a Random Access coding scenario.

However, potentially decoupling the decoding process and output process may result in situations, when the output process, and therefore the DRA application, may be specified by a DRA APS which may have already been overwritten in the DRA APS buffer with a new DRA APS during the decoding process.

To ensure that DRA APS data in the APS buffer would not be overwritten with different DRA APS data during the decoding process until DRA is applied by a video decoder, such as video decoder 300 during the output process, a codec, such as video encoder 200, may prevent overwriting the DRA APS buffer entry with different data during the decoding process by constraining the bitstream such that every DRA APS of a particular ID number should consist of (or alternatively include) identical content. This effectively implements a static APS buffer size of N, e.g., N is equal to 32 entries, as in MPEG5 EVC.

For example, video encoder 200 may determine a first DRA APS ID for a first picture of the video data and determine a first DRA APS for the first picture. Video encoder 200 may also determine a second DRA APS ID for a second picture of the video data and determine a second DRA APS for the second picture. Video encoder 200 may process the first picture in accordance with the first DRA APS and the second picture in accordance with the second DRA APS. In some examples, video encoder 200 may assign the second DRA APS ID such that the second DRA APS ID is different than the first DRA APS ID when the first DRA APS is different than the second DRA APS. In some examples, video encoder 200 may determine the second DRA APS to be equal to the first DRA APS when the second DRA APS ID is the same as the first DRA APS ID. For example, if the first DRA APS ID equals the second DRA APS ID, the first DRA APS equals the second DRA APS.

For example, video decoder 300 may determine a first DRA APS ID for a first picture of the video data. Video decoder 300 may determine a DRA APS for the first picture. Video decoder 300 may store the DRA APS in an APS buffer. Video decoder 300 may determine a second DRA APS ID for a second picture of the video data. Based on the second DRA APS ID being equal to the first DRA APS ID, video decoder 300 may prevent overwriting of the stored DRA APS with different data. For example, video decoder 300 may refraining from overwriting the stored DRA APS or video decoder 300 may overwrite the stored DRA APS with an identical DRA APS.

APS raw byte sequence payload (RBSP) semantics according to the techniques of this disclosure are now described.

adaptation_parameter_set_id provides an identifier for the APS for reference by other syntax elements.

All APS NAL units with aps_param_type equal to DRA_APS and a particular value of adaptation_parameter_set_id within a coded video sequence (CVS), shall have the same content.

According to the techniques of this disclosure, for bitstream conformance, the following conditions apply:

When multiple APSs of DRA_APS type with the same value of adaptation_parameter_set_id are referred to by two or more pictures within a CVS, the multiple APSs of type DRA_APS with the same value of adaptation_parameter_set_id shall have the same content.

Figure 14:
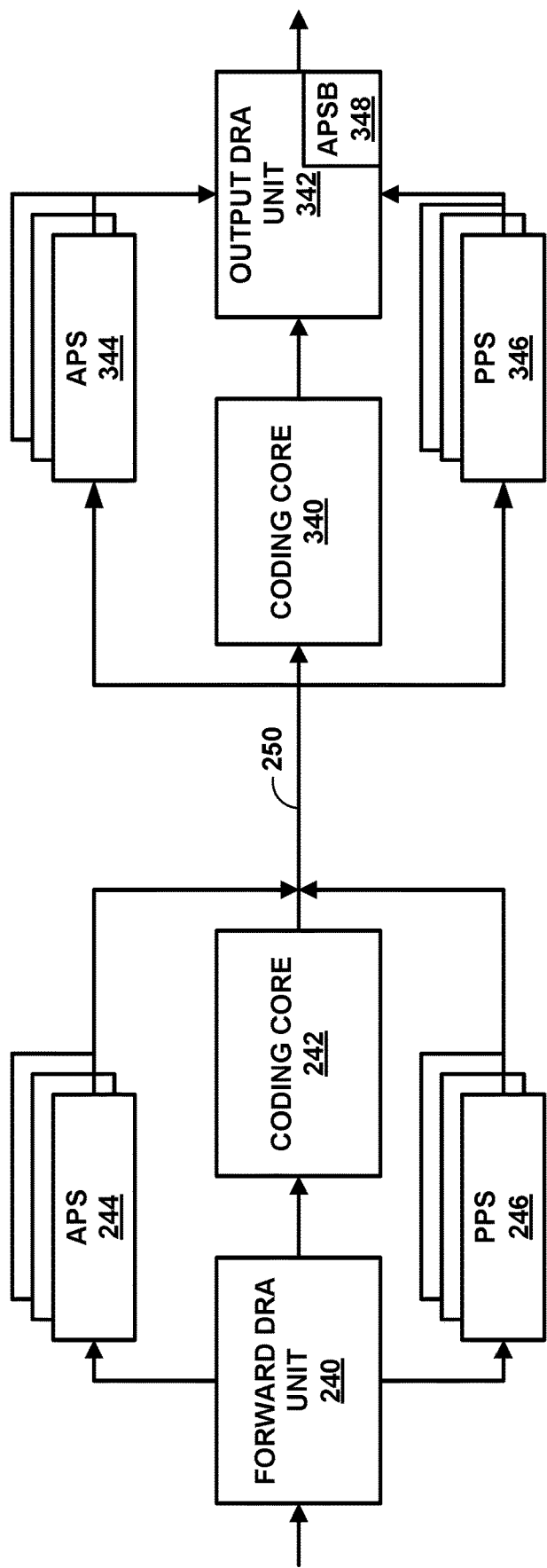
FIG. 14 is a block diagram of a video encoder and video decoder system including DRA units.

FIG. 14 is a block diagram of a video encoder and video decoder system including DRA units. A video encoder, such as video encoder 200, may include forward DRA unit 240 and coding core 242. In some examples, coding core 242 may include the units depicted in FIG. 3 and may function as described above with respect to FIG. 3. Video encoder 200 may also determine a plurality of APSs 244 and a plurality of PPSs 246 that may include information from forward DRA unit 240.

According to the techniques of this disclosure, forward DRA unit 240 may determine a first DRA APS (of APSs 244) for a first picture of the video data. Forward DRA unit 240 may assign a first DRA APS ID to the first DRA APS. Forward DRA unit 240 may determine a second DRA APS (of APSs 244) for a second picture of the video data; assign a second DRA APS ID to the second DRA APS. Coding core 242 may signal, in bitstream 250, the first DRA APS. Forward DRA unit 240 may process the first picture in accordance with the first DRA APS. Forward DRA unit 240 may determine whether the first DRA APS ID is equal to the second DRA APS ID. If the first DRA APS ID is equal to the second DRA APS ID, forward DRA unit 240 may process the second picture in accordance with the first DRA APS; and if the first DRA APS ID is not equal to the second DRA APS ID, coding core 242 may signal, in the bitstream, the second DRA APS and forward DRA unit 240 may process the second picture in accordance with the second DRA APS.

A video decoder, such as video decoder 300, may include coding core 340 and output DRA unit 342. In some examples, coding core 342 may include the units depicted in FIG. 4 and may function as described above with respect to FIG. 4. Video decoder 300 may also determine a plurality of APSs 344 and a plurality of PPSs 346 which may include information to be used by output DRA unit 342.

According to the techniques of this disclosure, output DRA unit 342 may determine a first DRA APS ID for a first picture of the video data. Output DRA unit 342 may determine a DRA APS for the first picture. Output DRA unit 342 may store the DRA APS in APS buffer (APSB) 348. Output DRA unit 342 may determine a second DRA APS ID for a second picture of the video data. Based on the second DRA APS ID being equal to the first DRA APS ID, output DRA unit 342 may prevent overwriting of the stored DRA APS with different data and process the first picture and the second picture in accordance with the DRA APS.

Figure 15:
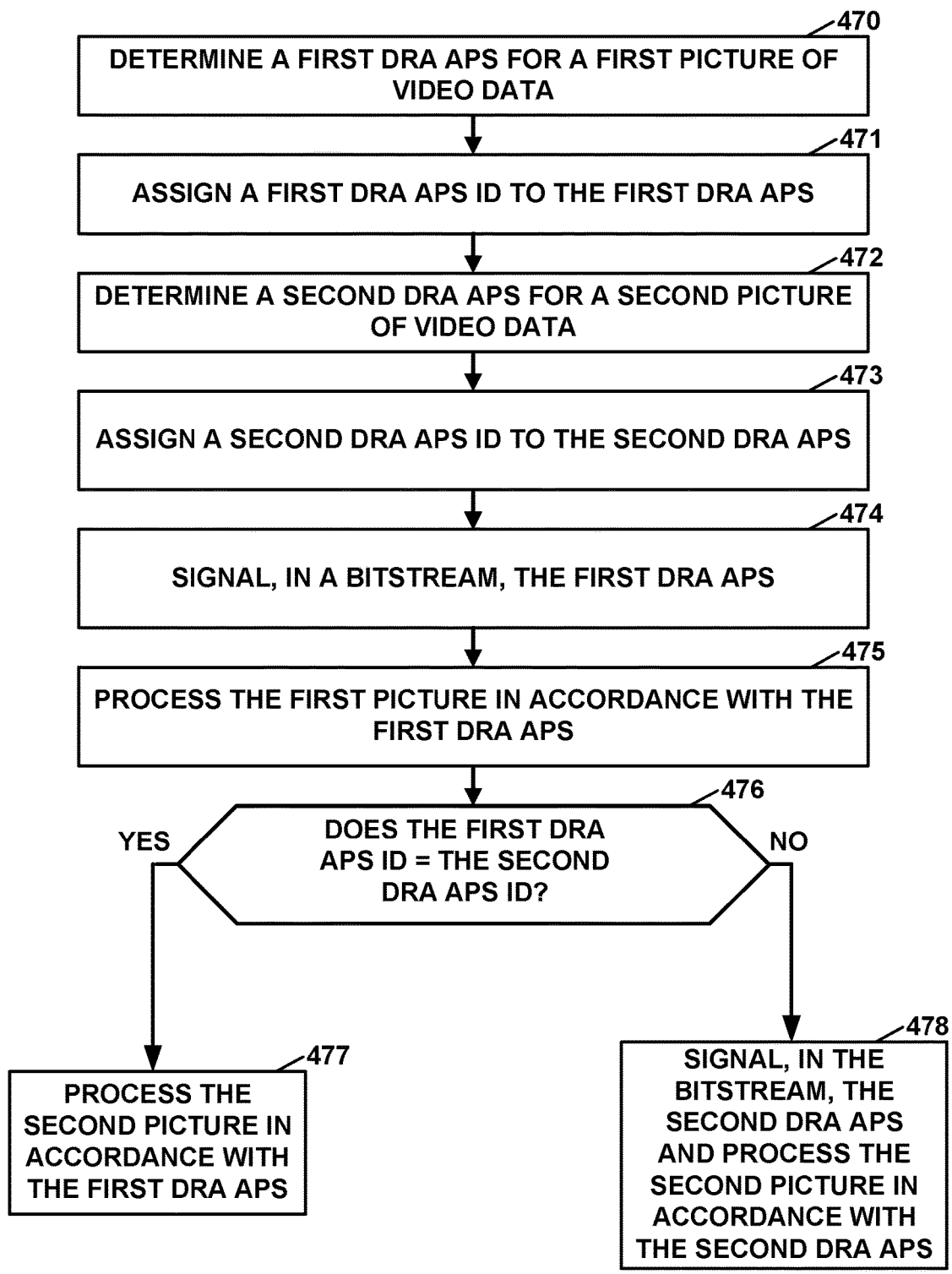
FIG. 15 is a flowchart illustrating example DRA APS encoding techniques according to this disclosure.

FIG. 15 is a flowchart illustrating example DRA APS encoding techniques according to this disclosure. Video encoder 200 may determine a first DRA APS for a first picture of video data (470). For example, video encoder 200 may determine DRA parameters to be applied the to the first picture of video data and include those DRA parameters in the first DRA APS. Video encoder 200 may assign a first DRA APS ID to the first DRA APS (471). For example, video encoder 200 may determine a first DRA APS ID to identify the first DRA APS. Video encoder 200 may signal this first DRA APS ID in a PPS associated with the first picture. Video encoder 200 may determine a second DRA APS for a second picture of video data (472). For example, video encoder 200 may determine DRA parameters to be applied to the second picture of video data and signal a second DRA APS based on the determined DRA parameters.

Video encoder 200 may assign a second DRA APS ID to the second DRA APS (473). For example, video encoder 200 may assign a second DRA APS ID to identify the second DRA APS. Video encoder 200 may signal the second DRA APS ID in a PPS associated with the second picture.

Video encoder 200 may signal, in a bitstream, the first DRA APS (474). For example, video encoder 200 may signal the first DRA APS to video decoder 300 for storage in an APS buffer.

Video encoder 200 may process the first picture in accordance with the first DRA APS (475). For example, video encoder 200 may apply a first DRA to the first picture based on parameters that video encoder 200 may code in the first DRA APS and signal the first DRA APS to video decoder 300 for storage in the APS buffer.

Video encoder 200 may determine whether the first DRA APS ID is equal to the second DRA APS ID (476). For example, video encoder 200 may compare the first DRA APS ID to the second DRA APS ID. If the first DRA APS ID is equal to the second DRA APS ID (the "YES" path in FIG. 15), video encoder 200 may process the second picture in accordance with the first DRA APS (477). For example, video encoder 200 may apply DRA to the second picture in accordance with the first DRA APS. If the first DRA APS ID is not equal to the second DRA APS ID (the "NO" path in FIG. 15), video encoder 200 may signal, in the bitstream, the second DRA APS and process the second picture in accordance with the second DRA APS (478). For example, video encoder 200 may apply DRA to the second picture in accordance with the second DRA APS and signal the second DRA APS to video decoder 300 for storage in the APS buffer. In this manner, video encoder 200 may prevent the overwriting of data by different data in an APS buffer in video decoder 300.

In some examples, video encoder 200 may limit the number of bits in a DRA APS to N, where N is an integer number, such as 32. In some examples, video encoder 200 may signal, in the bitstream, the first DRA APS ID and signal, in the bitstream, the second DRA APS ID.

In some examples, video encoder 200 may refrain from assigning a value of the second DRA APS ID to equal a value of the first DRA APS ID when the first DRA APS does not equal the second DRA APS. For example, when the first DRA APS and the second DRA APS are different or contain different data, video encoder 200 may assign a different DRA APS ID for the second picture than video encoder 200 may assign for the first picture. In some examples, video encoder may determine whether the first DRA APS equals the second DRA APS. In some examples, as part of refraining from assigning the value of the second DRA APS ID to equal the value of the first DRA APS ID, video encoder 200 may assign a different value to the second DRA APS ID than the value of the first DRA APS ID. In some examples, video encoder 200 may determine whether the first DRA APS equals the second DRA APS and based on the first DRA APS equaling the second DRA APS, video encoder 200 may determine the second DRA APS ID to equal the first DRA APS ID.

In some examples, the APS buffer is a static size. In some examples, the APS buffer is configured to store 32 entries. In some examples, video encoder 200 prevents a loss of data due to overwriting of the APS buffer in video decoder 300 based on the second DRA APS being equal to the first DRA APS.

Figure 16:
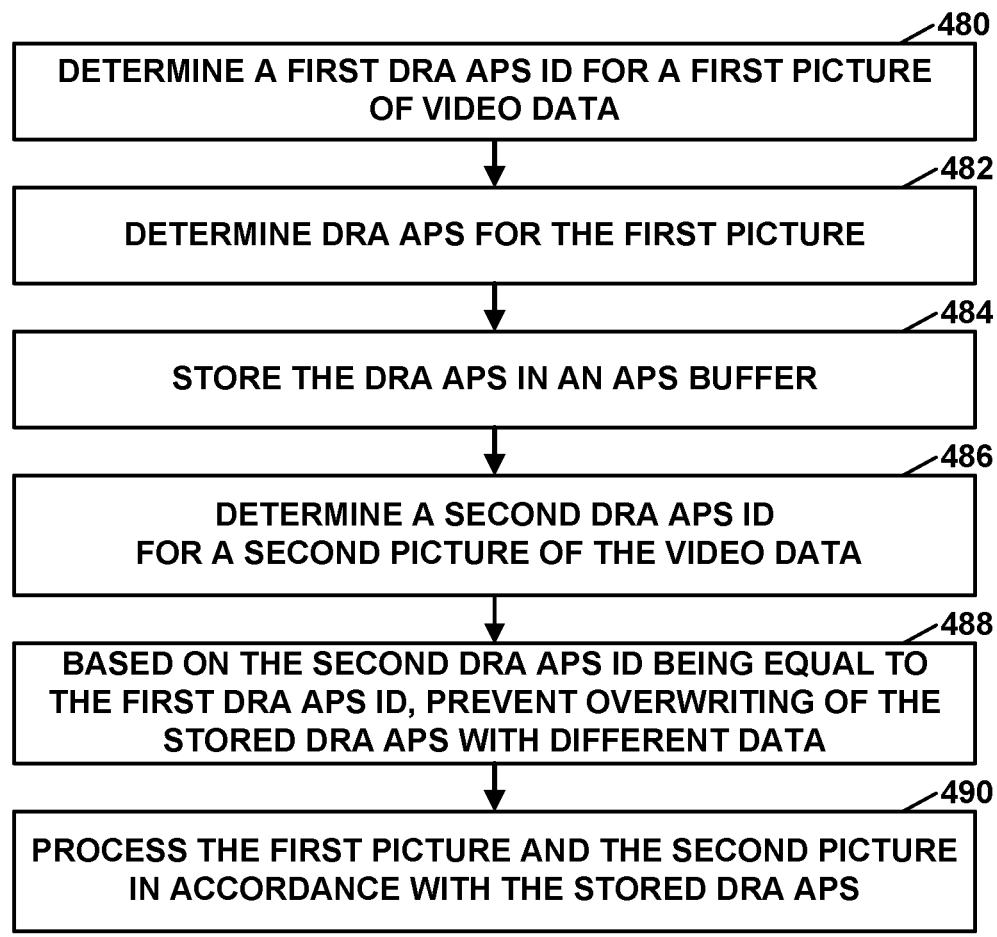
FIG. 16 is a flowchart illustrating example DRA APS decoding techniques according to this disclosure.

FIG. 16 is a flowchart illustrating example DRA APS decoding techniques according to this disclosure. Video decoder 300 may determine a first DRA APS ID for a first picture of the video data (480). For example, video decoder 300 may parse a syntax element, such as adaptation_parameter_set_id, which may be in a PPS associated with the first picture in a bitstream, to determine the first DRA APS ID. Video decoder 300 may determine a DRA APS for the first picture (482). For example, video decoder 300 may parse a DRA APS associated with the first picture in a bitstream to determine the DRA APS for the first picture. Video decoder 300 may store the DRA APS in an APS buffer (484). For example, video decoder 300 may store the DRA APS in APS buffer 348 (FIG. 14).

Video decoder 300 may determine a second DRA APS ID for a second picture of the video data (486). For example, video decoder 300 may parse a syntax element, such as adaptation_parameter_set_id, which may be in a PPS associated with the second picture in a bitstream, to determine the second DRA APS ID. Based on the second DRA APS ID being equal to the first DRA APS ID, video decoder 300 may prevent overwriting of the stored DRA APS with different data (488). For example, as part of preventing the overwriting of the stored DRA APS with different data, video decoder 300 may refraining from overwriting the stored DRA APS. In another example, as part of preventing the overwriting of the stored DRA APS with different data, video decoder 300 may overwrite the stored DRA APS with an identical DRA APS.

Video decoder 300 may process the first picture and the second picture in accordance with the stored DRA APS (490). For example, video decoder 300 may use parameters in the stored DRA APS to perform DRA on the first picture and the second picture to create a DRA adjusted first picture and a DRA adjusted second picture. In some examples, video decoder 300 may output the DRA adjusted first picture and the DRA adjusted second picture. For example, video decoder 300 may output the DRA adjusted first picture and the DRA adjusted second picture for display on a display device, such as display device 118 of FIG. 1.

Figure 17:
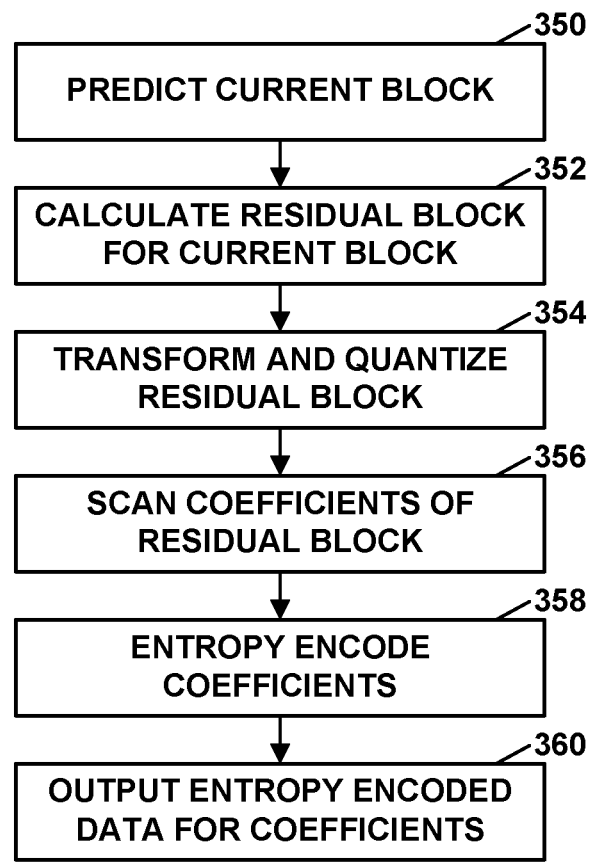
FIG. 17 is a flowchart illustrating an example of video encoding.

FIG. 17 is a flowchart illustrating an example method for encoding a current block. The current block may comprise a current CU. Although described with respect to video encoder 200 (FIGS. 1 and 3), it should be understood that other devices may be configured to perform a method similar to that of FIG. 17.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360). Video encoder 200 may also perform the DRA techniques of FIG. 15.

Figure 18:
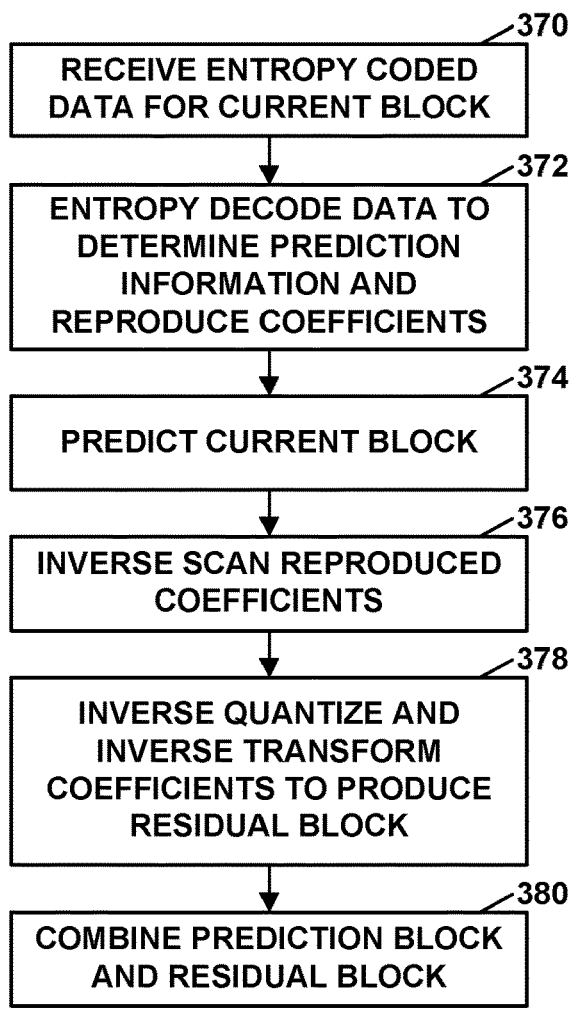
FIG. 18 is a flowchart illustrating an example of video decoding.

FIG. 18 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 18.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380). Video decoder 300 may also apply DRA to decoded pictures, such as is described with respect to FIG. 16.

This disclosure includes the following examples.

Clause 1A. A method of coding video data, the method comprising: determining a dynamic range adjustment (DRA) adaptation parameter set (APS) for a first picture of video data; determining a DRA APS identifier (ID) for the first picture of video data; determining whether a DRA APS ID for a second picture of video data is equal to the DRA APS ID for the first picture of video data; based on the DRA APS ID for the second picture of video data being equal to the DRA APS ID for the first picture of video data, determining a DRA APS for the second picture of video data to be equal to a DRA APS for the first picture of video data; and processing the second picture of video data based on the DRA APS for the second picture of video data.

Clause 2A. The method of clause 1A, further comprising storing the DRA APS for the first picture of video data in an APS buffer.

Clause 3A. The method of clause 2A, wherein the APS buffer is a static size.

Clause 4A. The method of clause 3A, wherein the APS buffer is configured to store 32 entries.

Clause 5A. The method of any of clauses 2A-4A, further comprising preventing overwriting of the APS buffer based on the DRA APS ID for the second picture of video data being equal to the DRA APS ID for the first picture of video data Clause 6A. The method of any of clauses 1A-5A, wherein coding comprises decoding.

Clause 7A. The method of any of clauses 1A-6A, wherein coding comprises encoding.

Clause 8A. A device for coding video data, the device comprising one or more means for performing the method of any of clauses 1A-7A.

Clause 9A. The device of clause 8A, wherein the one or more means comprise one or more processors implemented in circuitry.

Clause 10A. The device of any of clauses 8A and 9A, further comprising a memory to store the video data.

Clause 11A. The device of any of clauses 8A-10A, further comprising a display configured to display decoded video data.

Clause 12A. The device of any of clauses 8A-11A, wherein the device comprises one or more of a camera, a computer, a mobile device, a broadcast receiver device, or a set-top box.

Clause 13A. The device of any of clauses 8A-12A, wherein the device comprises a video decoder.

Clause 14A. The device of any of clauses 8A-13A, wherein the device comprises a video encoder.

Clause 15A. A computer-readable storage medium having stored thereon instructions that, when executed, cause one or more processors to perform the method of any of clauses 1A-7A.

Clause 16A. A device for encoding video data, the device comprising: means for determining a dynamic range adjustment (DRA) adaptation parameter set (APS) for a first picture of video data; determining a DRA APS ID for the first picture of video data; means for determining whether a DRA APS ID for a second picture of video data is equal to the DRA APS ID for the first picture of video data; means for, based on the DRA APS ID for the second picture of video data being equal to the DRA APS ID for the first picture of video data, determining a DRA APS for the second picture of video data to be equal to a DRA APS for the first picture of video data; and means for processing the second picture of video data based on the DRA APS for the second picture of video data.

Clause 1B. A method of encoding video data, the method comprising: determining a first dynamic range adjustment (DRA) adaptation parameter set (APS) for a first picture of the video data; assigning a first DRA APS ID to the first DRA APS;

determining a second DRA APS for a second picture of the video data; assigning a second DRA APS ID to the second DRA APS; signaling, in a bitstream, the first DRA APS; processing the first picture in accordance with the first DRA APS; determining whether the first DRA APS ID is equal to the second DRA APS ID; if the first DRA APS ID is equal to the second DRA APS ID, processing the second picture in accordance with the first DRA APS; and if the first DRA APS ID is not equal to the second DRA APS ID, signaling, in the bitstream, the second DRA APS and processing the second picture in accordance with the second DRA APS.

Clause 2B. The method of clause 1B, further comprising limiting a number of bits in a DRA APS to N, where N is an integer number.

Clause 3B. The method of clause 1B or 2B, further comprising: signaling, in the bitstream, the first DRA APS ID; and signaling, in the bitstream, the second DRA APS ID.

Clause 4B. The method of any combination of clauses 1B-3B, further comprising: refraining from assigning a value of the second DRA APS ID to equal a value of the first DRA APS ID when the first DRA APS does not equal the second DRA APS.

Clause 5B. The method of clause 4B, wherein the refraining from assigning the value of the second DRA APS ID to equal the value of the first DRA APS ID comprises assigning a different value to the second DRA APS ID than the value of the first DRA APS ID.

Clause 6B. The method of any combination of clauses 1B-5B, further comprising: refraining from signaling, in the bitstream, the second DRA APS when the first DRA APS ID is equal to the second DRA APS ID.

Clause 7B. The method of any combination of clauses 1B-6B, wherein the first DRA APS is signaled to a video decoder for storage in an APS buffer.

Clause 8B. The method of clause 7B, wherein the APS buffer is a static size.

Clause 9B. The method of clause 8B, wherein the APS buffer is configured to store 32 entries.

Clause 10B. A device for encoding video data, the device comprising: a memory configured to store the video data; and one or more processors implemented in circuitry and communicatively coupled to the memory, the one or more processors being configured to: determine a first dynamic range adjustment (DRA) adaptation parameter set (APS) for a first picture of the video data; assign a first DRA APS ID to the first DRA APS; determine a second DRA APS for a second picture of the video data; assign a second DRA APS ID to the second DRA APS; signal, in a bitstream, the first DRA APS; process the first picture in accordance with the first DRA APS; determine whether the first DRA APS ID is equal to the second DRA APS ID; if the first DRA APS ID is equal to the second DRA APS ID, process the second picture in accordance with the first DRA APS; and if the first DRA APS ID is not equal to the second DRA APS ID, signal, in the bitstream, the second DRA APS and process the second picture in accordance with the second DRA APS.

Clause 11B. The device of clause 10B, wherein the one or more processors are further configured to limit a number of bits in a DRA APS to N, where N is an integer number.

Clause 12B. The device of clause 10B or 11B, wherein the one or more processors are further configured to: signal, in the bitstream, the first DRA APS ID; and signal, in the bitstream, the second DRA APS ID.

Clause 13B. The device of any combination of clauses 10B-12B, wherein the one or more processors are further configured to: refrain from assigning a value of the second DRA APS ID to equal a value of the first DRA APS ID when the first DRA APS does not equal the second DRA APS.

Clause 14B. The device of clause 13B, wherein as part of refraining from assigning the value of the second DRA APS ID to equal the value of the first DRA APS ID, the one or more processors are configured to assign a different value to the second DRA APS ID than the value of the first DRA APS ID.

Clause 15B. The device of any combination of clauses 10B-14B, wherein the one or more processors are further configured to: refrain from signaling, in the bitstream, the second DRA APS when the first DRA APS ID is equal to the second DRA APS ID.

Clause 16B. The device of any combination of clauses 10B-15B, wherein the first DRA APS is signaled to a video decoder for storage in an APS buffer.

Clause 17B. The device of clause 16B, wherein the APS buffer is a static size.

Clause 18B. The device of clause 17B, wherein the APS buffer is configured to store 32 entries.

Clause 19B. The device of any combination of clauses 10B-18B, further comprising: a camera configured to capture the video data.

Clause 20B. A non-transitory computer-readable storage medium storing instructions that, when executed, cause one or more processors to: determine a first dynamic range adjustment (DRA) adaptation parameter set (APS) for a first picture of video data; assign a first DRA APS ID to the first DRA APS; determine a second DRA APS for a second picture of the video data; assign a second DRA APS ID to the second DRA APS; signal, in a bitstream, the first DRA APS; process the first picture in accordance with the first DRA APS; determine whether the first DRA APS ID is equal to the second DRA APS ID; if the first DRA APS ID is equal to the second DRA APS ID, process the second picture in accordance with the first DRA APS; and if the first DRA APS ID is not equal to the second DRA APS ID, signal, in the bitstream, the second DRA APS and process the second picture in accordance with the second DRA APS.

Clause 21B. A method of decoding video data, the method comprising: determining a first dynamic range adjustment (DRA) adaptation parameter set (APS) identifier (ID) for a first picture of the video data; determining a DRA APS for the first picture; storing the DRA APS in an APS buffer; determining a second DRA APS ID for a second picture of the video data; based on the second DRA APS ID being equal to the first DRA APS ID, preventing overwriting of the stored DRA APS with different data; and processing the first picture and the second picture in accordance with the stored DRA APS.

Clause 22B. The method of clause 21B, wherein preventing the overwriting of the stored DRA APS with different data comprises refraining from overwriting the stored DRA APS.

Clause 23B. The method of clause 21B or 22B, wherein preventing the overwriting of the stored DRA APS with different data comprises overwriting the stored DRA APS with an identical DRA APS.

Clause 24B. The method of any combination of clauses 21B-23B, wherein processing the first picture and the second picture creates a DRA adjusted first picture and a DRA adjusted second picture, the method further comprising: outputting the DRA adjusted first picture and the DRA adjusted second picture.

Clause 25B. The method of any combination of clauses 21B-24B, wherein the APS buffer is a static size.

Clause 26B. The method of clause 25B, wherein the APS buffer is configured to store 32 entries.

Clause 27B. A device for decoding video data, the device comprising: a memory configured to store the video data; and one or more processors implemented in circuitry and communicatively coupled to the memory, the one or more processors being configured to: determine a first dynamic range adjustment (DRA) adaptation parameter set (APS) identifier (ID) for a first picture of the video data; determine a DRA APS for the first picture; store the DRA APS in an APS buffer; determine a second DRA APS ID for a second picture of the video data; based on the second DRA APS ID being equal to the first DRA APS ID, prevent overwriting of the stored DRA APS with different data; and process the first picture and the second picture in accordance with the stored DRA APS.

Clause 28B. The device of clause 27B, wherein as part of preventing the overwriting of the stored DRA APS with different data, the one or more processors are configured to refrain from overwriting the stored DRA APS.

Clause 29B. The device of clause 27B or 28B, wherein as part of preventing the overwriting of the stored DRA APS with different data, the one or more processors are configured to overwrite the stored DRA APS with an identical DRA APS.

Clause 30B. The device of any combination of clauses 27B-29B, wherein processing the first picture and the second picture creates a DRA adjusted first picture and a DRA adjusted second picture, the one or more processors being further configured to: output the DRA adjusted first picture and the DRA adjusted second picture.

Clause 31B. The device of any combination of clauses 27B-30B, wherein the APS buffer is a static size.

Clause 32B. The device of clause 31B, wherein the APS buffer is configured to store 32 entries.

Clause 33B. A non-transitory computer-readable storage medium storing instructions that, when executed, cause one or more processors to: determine a first dynamic range adjustment (DRA) adaptation parameter set (APS) identifier (ID) for a first picture of video data; determine a DRA APS for the first picture; store the DRA APS in an APS buffer; determine a second DRA APS ID for a second picture of the video data; based on the second DRA APS ID being equal to the first DRA APS ID, prevent overwriting of the stored DRA APS with different data; and process the first picture and the second picture in accordance with the stored DRA APS.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   determining a first dynamic range adjustment (DRA) adaptation parameter set (APS) for a first picture of the video data;
   assigning a first DRA APS ID to the first DRA APS;
   determining a second DRA APS for a second picture of the video data;
   assigning a second DRA APS ID to the second DRA APS, wherein assigning the second DRA APS ID comprises refraining from assigning a value of the second DRA APS ID to be equal to a value of the first DRA APS ID when the first DRA APS does not equal the second DRA APS;
   signaling, in a bitstream, the first DRA APS;
   processing the first picture in accordance with the first DRA APS;
   determining whether the first DRA APS ID is equal to the second DRA APS ID;
   if the first DRA APS ID is equal to the second DRA APS ID, processing the second picture in accordance with the first DRA APS; and
   if the first DRA APS ID is not equal to the second DRA APS ID, signaling, in the bitstream, the second DRA APS and processing the second picture in accordance with the second DRA APS.

2. The method of claim 1, further comprising limiting a number of bits in a DRA APS to N, where N is an integer number.

3. The method of claim 1, further comprising:
   signaling, in the bitstream, the first DRA APS ID; and
   signaling, in the bitstream, the second DRA APS ID.

4. The method of claim 1, wherein refraining from assigning the value of the second DRA APS ID to equal the value of the first DRA APS ID comprises assigning a different value to the second DRA APS ID than the value of the first DRA APS ID.

5. The method of claim 1, further comprising:
   refraining from signaling, in the bitstream, the second DRA APS when the first DRA APS ID is equal to the second DRA APS ID.

6. The method of claim 1, wherein the first DRA APS is signaled to a video decoder for storage in an APS buffer.

7. The method of claim 6, wherein the APS buffer is a static size.

8. The method of claim 7, wherein the APS buffer is configured to store 32 entries.

9. A device for encoding video data, the device comprising:
   a memory configured to store the video data; and
   one or more processors implemented in circuitry and communicatively coupled to the memory, the one or more processors being configured to:
      determine a first dynamic range adjustment (DRA) adaptation parameter set (APS) for a first picture of the video data;
      assign a first DRA APS ID to the first DRA APS;
      determine a second DRA APS for a second picture of the video data;
      assign a second DRA APS ID to the second DRA APS, wherein as part of assigning the second DRA APS ID, the one or more processors are configured to refrain from assigning a value of the second DRA APS ID to equal a value of the first DRA APS ID when the first DRA APS does not equal the second DRA APS;
      signal, in a bitstream, the first DRA APS;
      process the first picture in accordance with the first DRA APS;
      determine whether the first DRA APS ID is equal to the second DRA APS ID;
      if the first DRA APS ID is equal to the second DRA APS ID, processing the second picture in accordance with the first DRA APS; and
      if the first DRA APS ID is not equal to the second DRA APS ID, signaling, in the bitstream, the second DRA APS and process the second picture in accordance with the second DRA APS.

10. The device of claim 9, wherein the one or more processors are further configured to limit a number of bits in a DRA APS to N, where N is an integer number.

11. The device of claim 9, wherein the one or more processors are further configured to:
    signal, in the bitstream, the first DRA APS ID; and
    signal, in the bitstream, the second DRA APS ID.

12. The device of claim 9, wherein as part of refraining from assigning the value of the second DRA APS ID to equal the value of the first DRA APS ID, the one or more processors are configured to assign a different value to the second DRA APS ID than the value of the first DRA APS ID.

13. The device of claim 9, wherein the one or more processors are further configured to:
    refrain from signaling, in the bitstream, the second DRA APS when the first DRA APS ID is equal to the second DRA APS ID.

14. The device of claim 9, wherein the first DRA APS is signaled to a video decoder for storage in an APS buffer.

15. The device of claim 14, wherein the APS buffer is a static size.

16. The device of claim 15, wherein the APS buffer is configured to store 32 entries.

17. The device of claim 9, further comprising:
a camera configured to capture the video data.

18. A non-transitory computer-readable storage medium storing instructions that, when executed, cause one or more processors to:
determine a first dynamic range adjustment (DRA) adaptation parameter set (APS) for a first picture of video data;
assign a first DRA APS ID to the first DRA APS;
determine a second DRA APS for a second picture of the video data;
assign a second DRA APS ID to the second DRA APS, wherein as part of assigning the second DRA APS ID, the instructions cause the one or more processors to refrain from assigning a value of the second DRA APS ID to equal a value of the first DRA APS ID when the first DRA APS does not equal the second DRA APS;
signal, in a bitstream, the first DRA APS;
process the first picture in accordance with the first DRA APS;
determine whether the first DRA APS ID is equal to the second DRA APS ID;
if the first DRA APS ID is equal to the second DRA APS ID, process the second picture in accordance with the first DRA APS; and
if the first DRA APS ID is not equal to the second DRA APS ID, signal, in the bitstream, the second DRA APS and process the second picture in accordance with the second DRA APS.

19. A method of decoding video data, the method comprising:
determining a first dynamic range adjustment (DRA) adaptation parameter set (APS) identifier (ID) for a first picture of the video data;
determining a DRA APS for the first picture;
storing the DRA APS in an APS buffer;
determining a second DRA APS ID for a second picture of the video data;
based on the second DRA APS ID being equal to the first DRA APS ID, preventing overwriting of the stored DRA APS with different data, wherein preventing the overwriting of the stored DRA APS with different data comprises refraining from overwriting the stored DRA APS; and
processing the first picture and the second picture in accordance with the stored DRA APS.

20. The method of claim 19, wherein preventing the overwriting of the stored DRA APS with different data comprises overwriting the stored DRA APS with an identical DRA APS.

21. The method of claim 19, wherein processing the first picture and the second picture creates a DRA adjusted first picture and a DRA adjusted second picture, the method further comprising:
outputting the DRA adjusted first picture and the DRA adjusted second picture.

22. The method of claim 19, wherein the APS buffer is a static size.

23. The method of claim 22, wherein the APS buffer is configured to store 32 entries.

24. A device for decoding video data, the device comprising:
a memory configured to store the video data; and
one or more processors implemented in circuitry and communicatively coupled to the memory, the one or more processors being configured to:
determine a first dynamic range adjustment (DRA) adaptation parameter set (APS) identifier (ID) for a first picture of the video data;
determine a DRA APS for the first picture;
store the DRA APS in an APS buffer;
determine a second DRA APS ID for a second picture of the video data;
based on the second DRA APS ID being equal to the first DRA APS ID, prevent overwriting of the stored DRA APS with different data, wherein as part of preventing the overwriting of the stored DRA APS with different data, the one or more processors are configured to refrain from overwriting the stored DRA APS; and
process the first picture and the second picture in accordance with the stored DRA APS.

25. The device of claim 24, wherein as part of preventing the overwriting of the stored DRA APS with different data, the one or more processors are configured to overwrite the stored DRA APS with an identical DRA APS.

26. The device of claim 24, wherein processing the first picture and the second picture creates a DRA adjusted first picture and a DRA adjusted second picture, the one or more processors being further configured to:
output the DRA adjusted first picture and the DRA adjusted second picture.

27. The device of claim 24, wherein the APS buffer is a static size.

28. The device of claim 27, wherein the APS buffer is configured to store 32 entries.

29. A non-transitory computer-readable storage medium storing instructions that, when executed, cause one or more processors to:
determine a first dynamic range adjustment (DRA) adaptation parameter set (APS) identifier (ID) for a first picture of video data;
determine a DRA APS for the first picture;
store the DRA APS in an APS buffer;
determine a second DRA APS ID for a second picture of the video data;
based on the second DRA APS ID being equal to the first DRA APS ID, prevent overwriting of the stored DRA APS with different data, wherein as part of preventing the overwriting of the stored DRA APS with different data, the instructions cause the one or more processors to refrain from overwriting the stored DRA APS; and
process the first picture and the second picture in accordance with the stored DRA APS.

* * * * *